US010371277B2

(12) United States Patent
Needham et al.

(10) Patent No.: US 10,371,277 B2
(45) Date of Patent: Aug. 6, 2019

(54) METHODS FOR CONTROLLING OPERATION OF A VALVE

(71) Applicant: Capstan Ag Systems, Inc., Topeka, KS (US)

(72) Inventors: Duane Needham, San Francisco, CA (US); Andrew J. Holtz, Atascadero, CA (US)

(73) Assignee: Capstan Ag Systems, Inc., Topeka, KS (US)

( * ) Notice: Subject to any disclaimer, the term of this patent is extended or adjusted under 35 U.S.C. 154(b) by 277 days.

(21) Appl. No.: 15/255,548

(22) Filed: Sep. 2, 2016

(65) Prior Publication Data

US 2016/0369913 A1    Dec. 22, 2016

Related U.S. Application Data

(62) Division of application No. 13/410,589, filed on Mar. 2, 2012, now Pat. No. 9,435,458.

(Continued)

(51) Int. Cl.
*F16K 31/06* (2006.01)
*A01G 25/16* (2006.01)
(Continued)

(52) U.S. Cl.
CPC .......... *F16K 31/0606* (2013.01); *A01G 25/16* (2013.01); *B05B 12/008* (2013.01); *B05B 12/087* (2013.01); *B05B 15/50* (2018.02); *F16K 31/0627* (2013.01); *F16K 31/0658* (2013.01); *G05D 16/2013* (2013.01);
(Continued)

(58) Field of Classification Search
CPC .............. F16K 27/029; F16K 31/0606; F16K 31/0613; F16K 31/0627; F16K 31/0651; F16K 31/0658; B05B 1/304; B05B 12/02
See application file for complete search history.

(56) References Cited

U.S. PATENT DOCUMENTS 5,052,174 A  *  10/1991  Bak .................. F02C 9/263
                                                    251/129.05
5,134,961 A  *   8/1992  Giles ............... A01M 7/0089
                                                    118/300

(Continued)

OTHER PUBLICATIONS

Patent Examination Report No. 1 for Australian Patent Application No. 2012201357 dated Apr. 26, 2016, 3 pages.

(Continued)

*Primary Examiner* — Ryan A Reis
(74) *Attorney, Agent, or Firm* — Armstrong Teasdale LLP

(57) ABSTRACT

An electric solenoid valve, methods for operating and/or actuating the solenoid valve, valve system diagnostics, and applications for use are described. The valve may be designed to actuate in a manner so as to control liquid flow into and/or through a device, such as a spray nozzle. By altering the characteristics of the electrical signal transmitted to the solenoid valve, the instantaneous pressure across the valve and duration of fluid flow through the valve can be controlled with a single actuator. Controlled cyclic durations of flow may be implemented to regulate the exact timing of flow through the valve. Alternatively, cyclic durations may occur with a pulse-width modulation technique in which the duty cycle regulates average flow rate through the valve.

18 Claims, 24 Drawing Sheets

Related U.S. Application Data

(60) Provisional application No. 61/449,924, filed on Mar. 7, 2011.

(51) Int. Cl.
  *B05B 12/00* (2018.01)
  *B05B 12/08* (2006.01)
  *G05D 16/20* (2006.01)
  *B05B 15/50* (2018.01)

(52) U.S. Cl.
  CPC ....... *B05B 12/085* (2013.01); *Y10T 137/0318* (2015.04); *Y10T 137/86413* (2015.04)

(56) References Cited

U.S. PATENT DOCUMENTS

| | | | | |
|---|---|---|---|---|
| 5,324,359 | A * | 6/1994 | Cleveland | B05C 5/0225 118/323 |
| 5,653,389 | A | 8/1997 | Henderson et al. | |
| 5,967,066 | A * | 10/1999 | Giles | A01C 23/024 111/119 |
| 6,019,347 | A * | 2/2000 | Adams | F16K 31/0651 251/129.05 |
| 6,302,080 | B1 * | 10/2001 | Kato | F02D 41/3827 123/295 |
| 6,374,624 | B1 * | 4/2002 | Cholkeri | F16K 31/0651 251/129.21 |
| 7,311,004 | B2 | 12/2007 | Giles | |
| 7,502,665 | B2 | 3/2009 | Giles et al. | |
| 2006/0102234 | A1 * | 5/2006 | Meisel | F16K 15/031 137/539 |
| 2006/0151544 | A1 * | 7/2006 | Greenwald | B67D 1/0079 222/333 |
| 2006/0273189 | A1 | 12/2006 | Grimm et al. | |
| 2008/0230624 | A1 * | 9/2008 | Giles | F16K 31/0655 239/69 |
| 2010/0032492 | A1 | 2/2010 | Grimm et al. | |

OTHER PUBLICATIONS

Office Action for Canadian Patent Application No. 2,770,013 dated Apr. 22, 2016, 3 pages.

Australian Examination Report No. 1 for Standard Patent Application, Application No. 2016253577, dated Jan. 25, 2018, 3 pps.

* cited by examiner

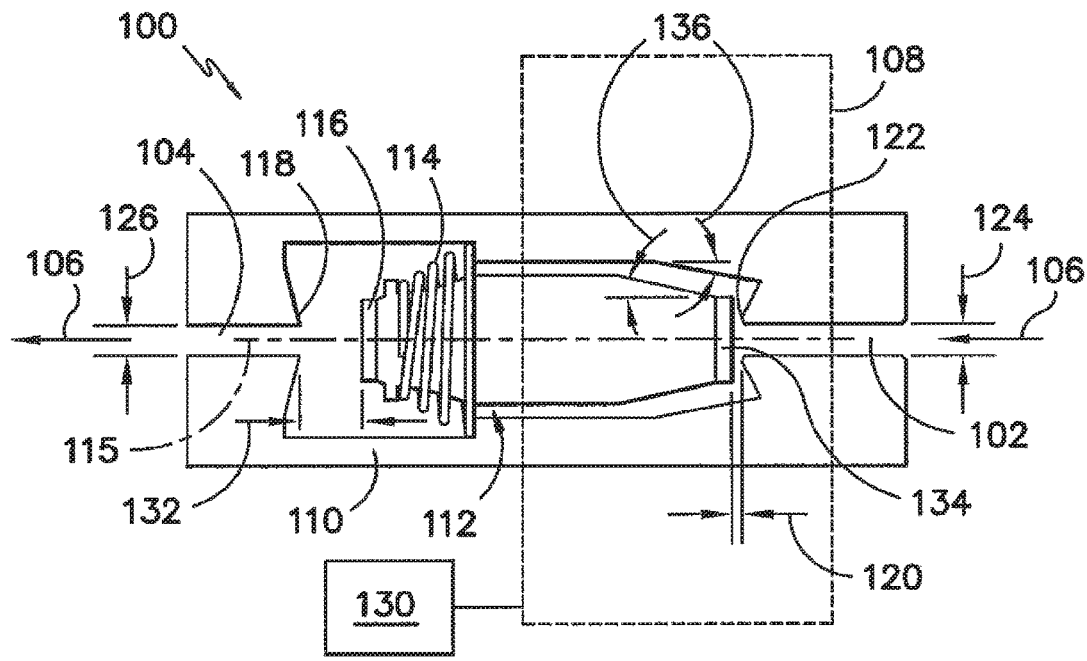
FIG. -1-
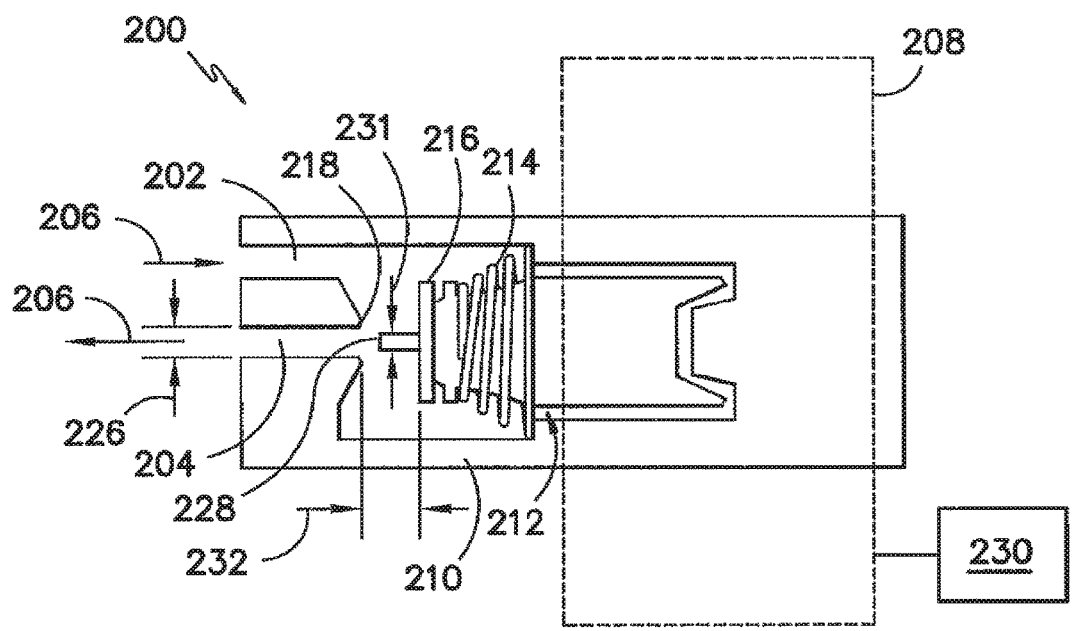
FIG. -2-

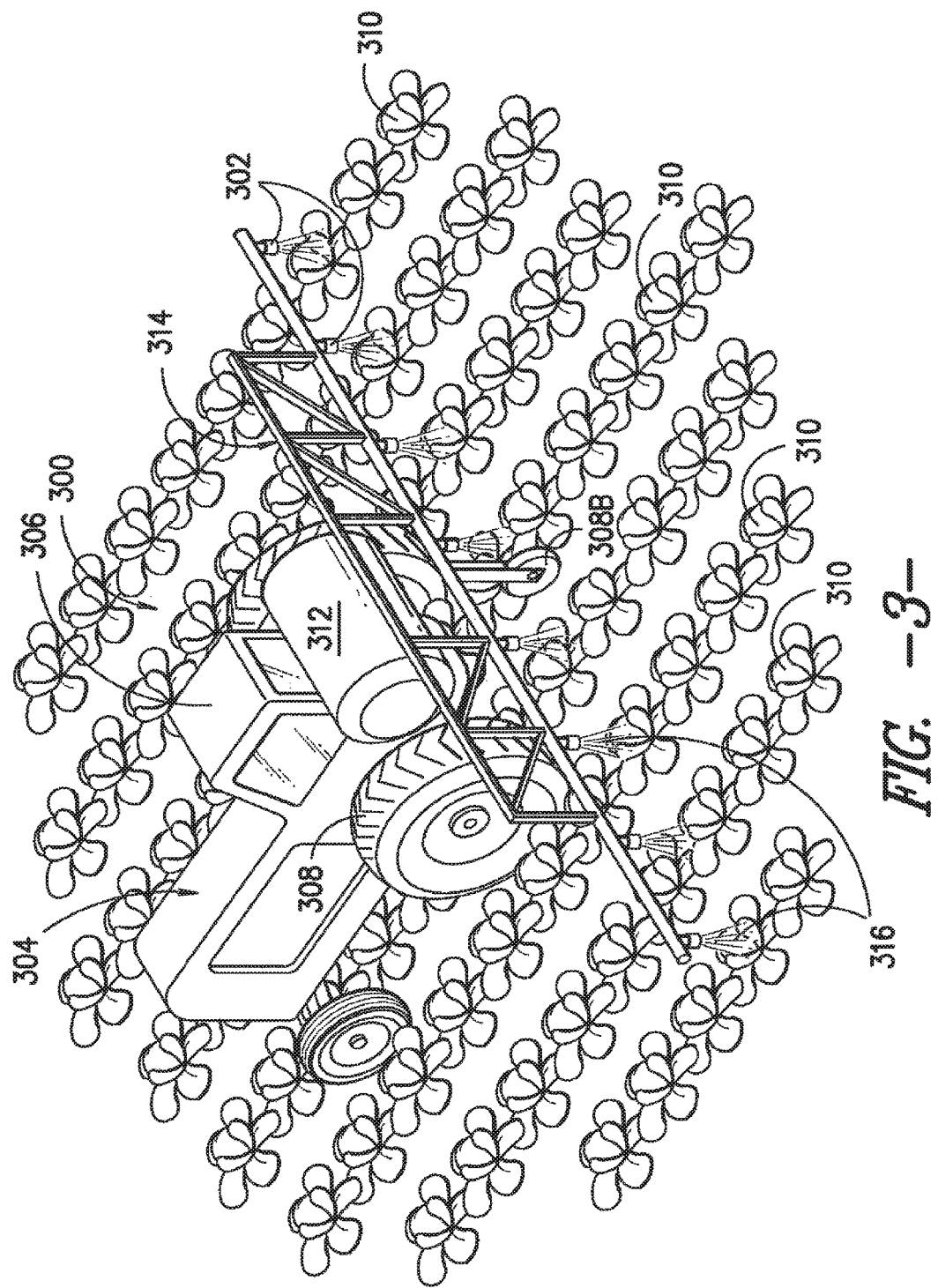
FIG. -3-

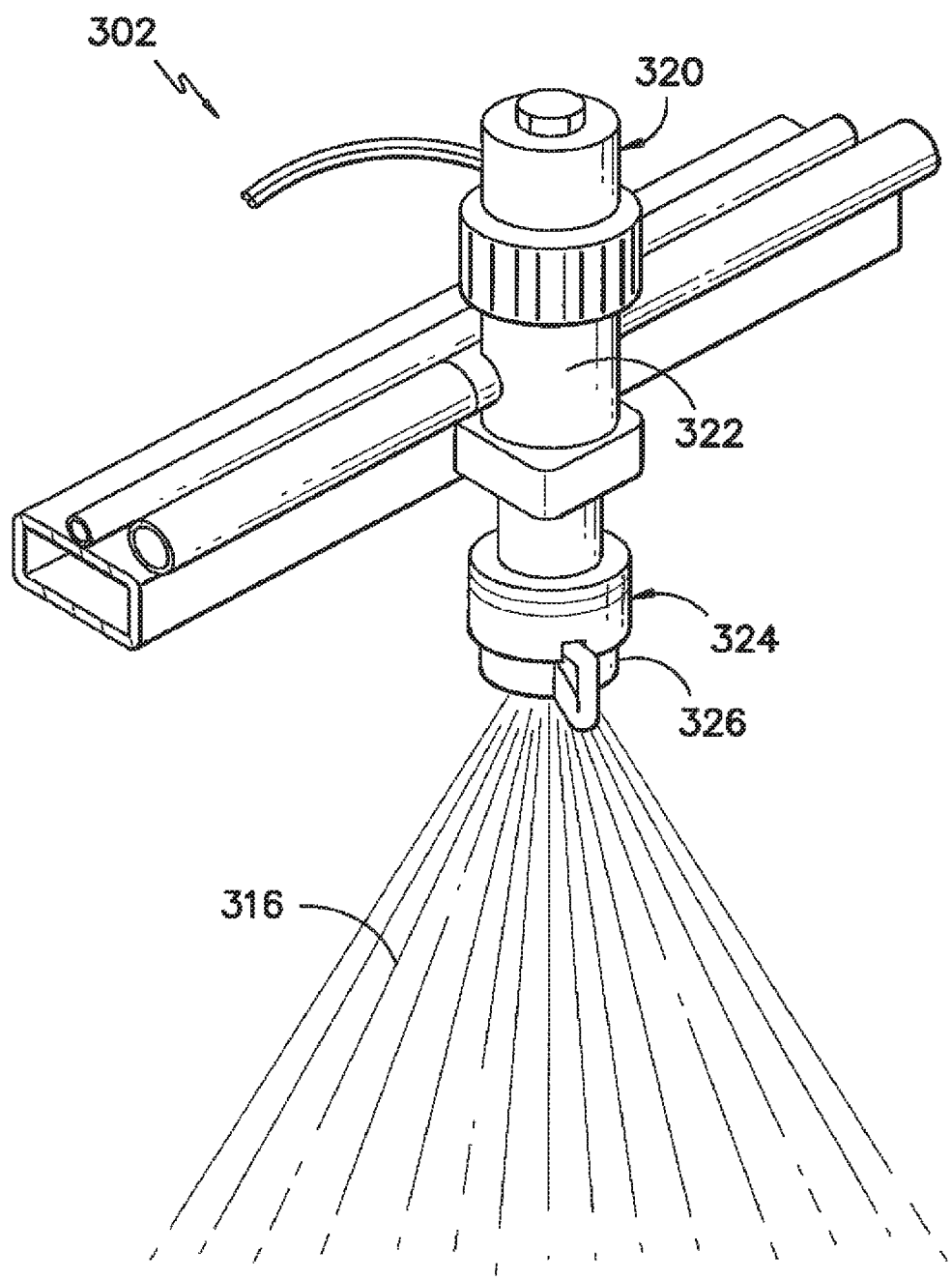
FIG. —4—

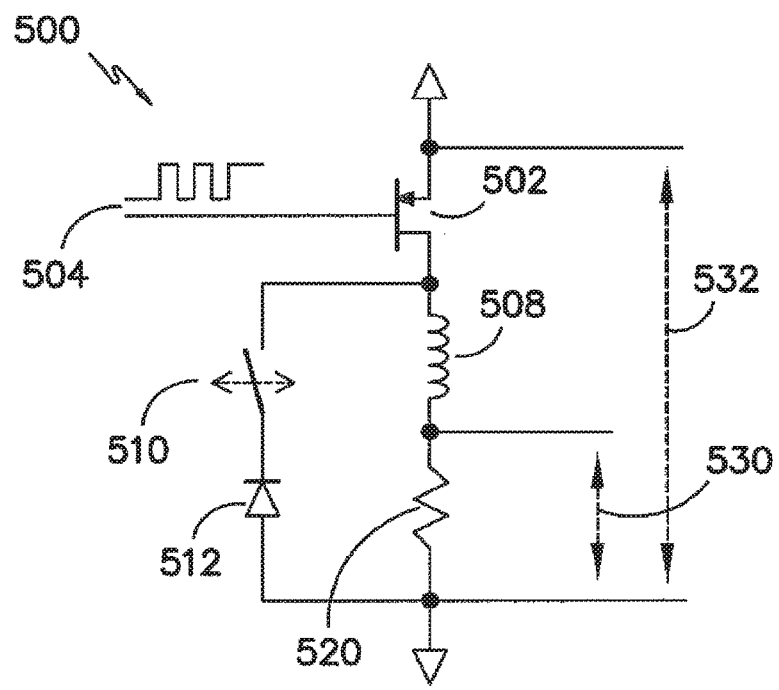
FIG. -5-
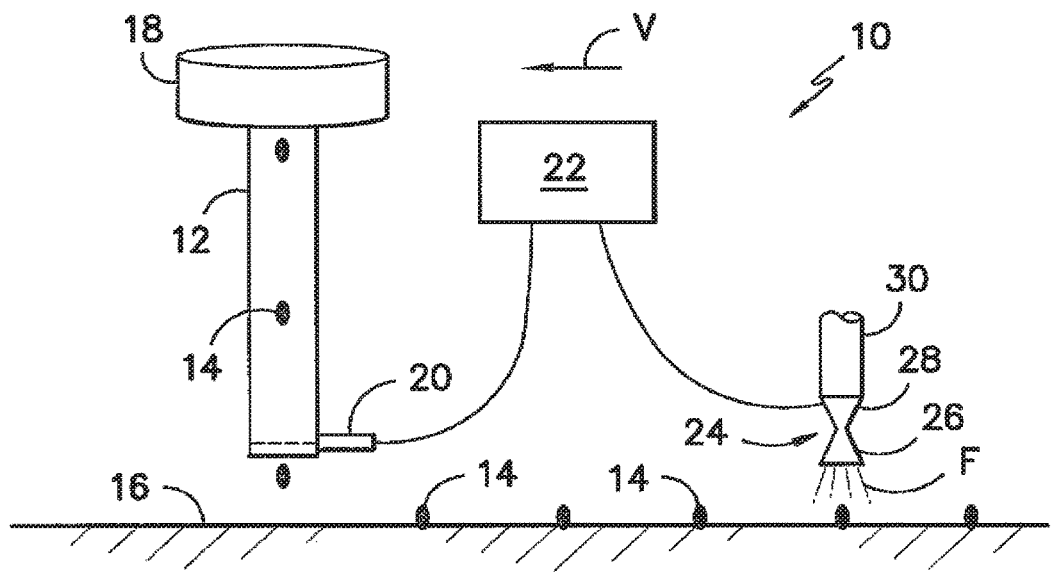
FIG. -6-

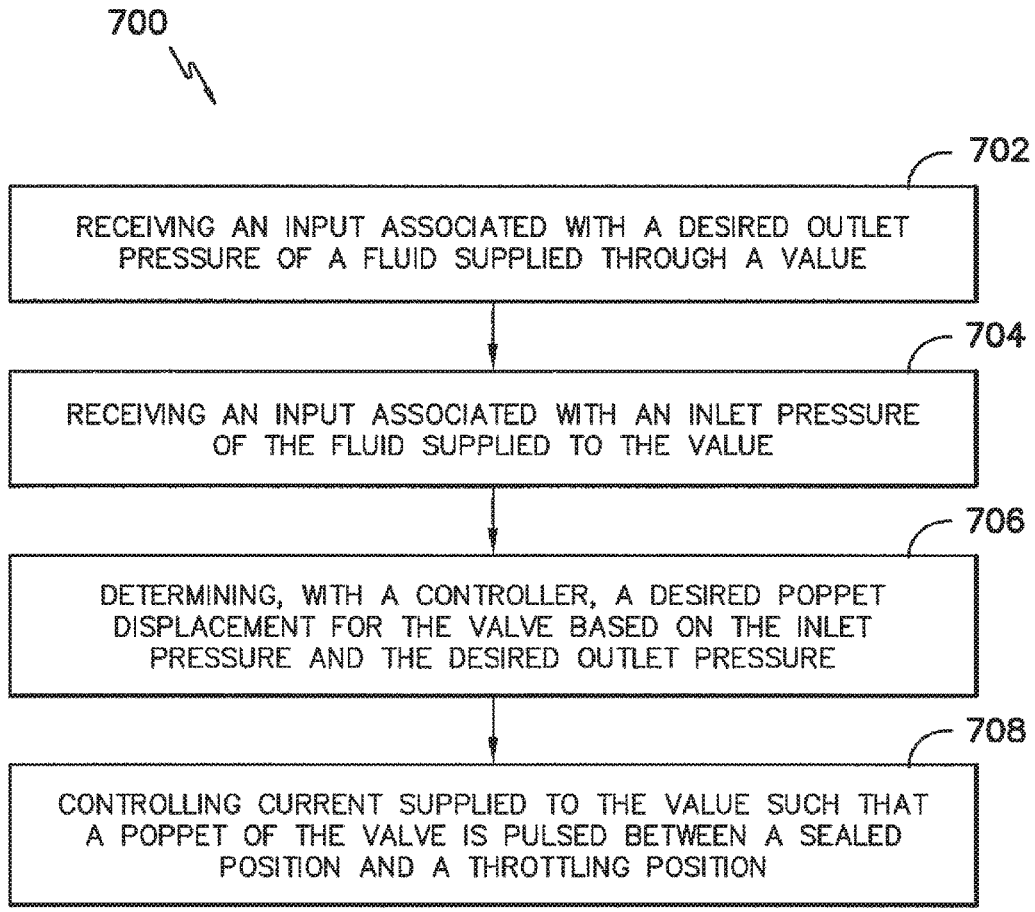
FIG. —7—

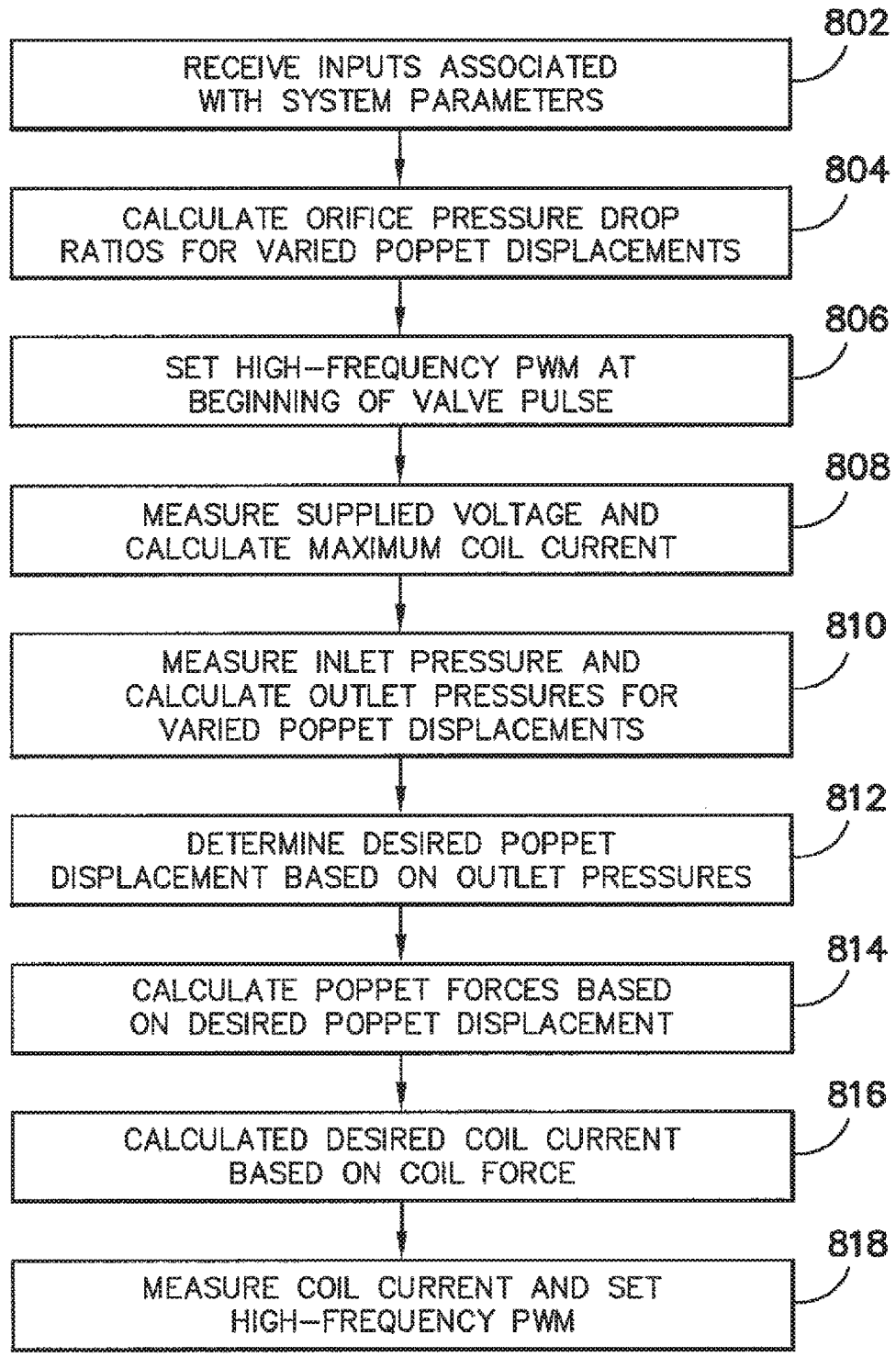
FIG. -8-

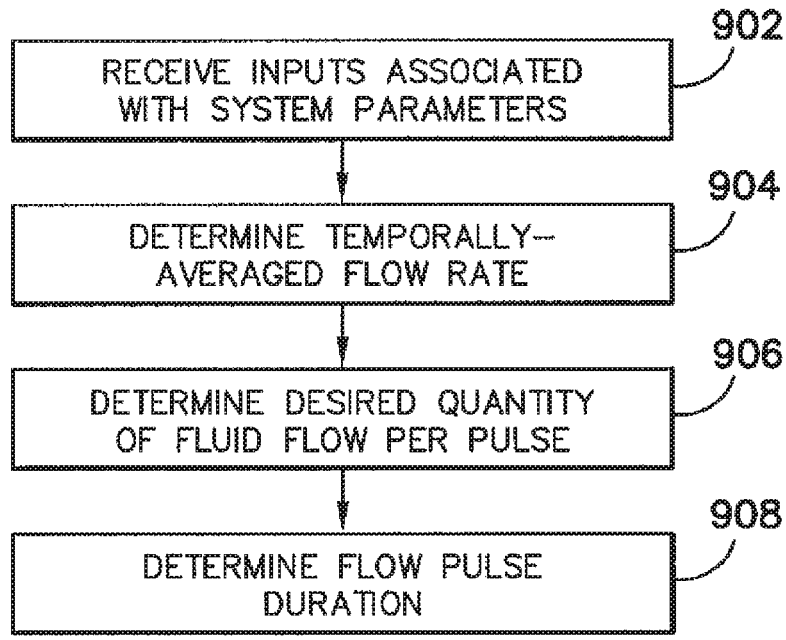
FIG. -9-
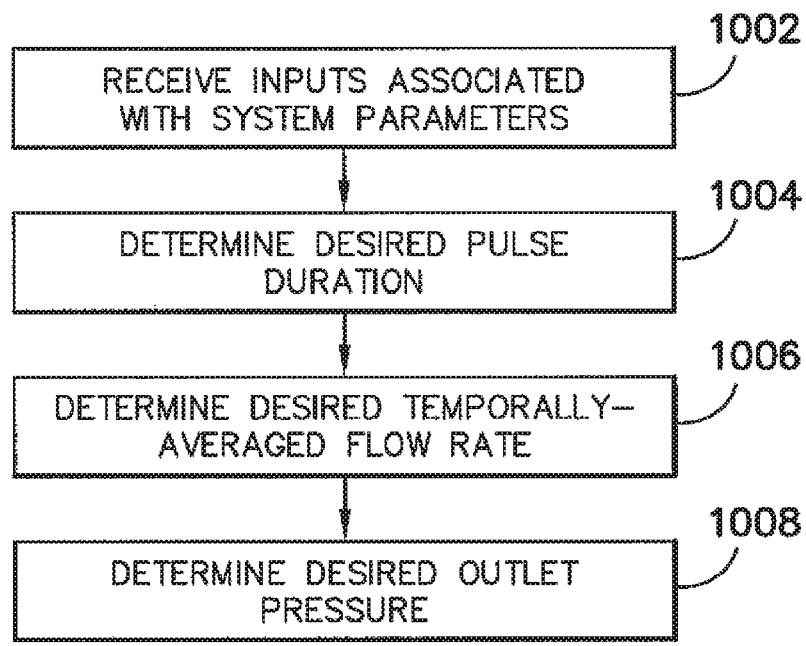
FIG. -10-

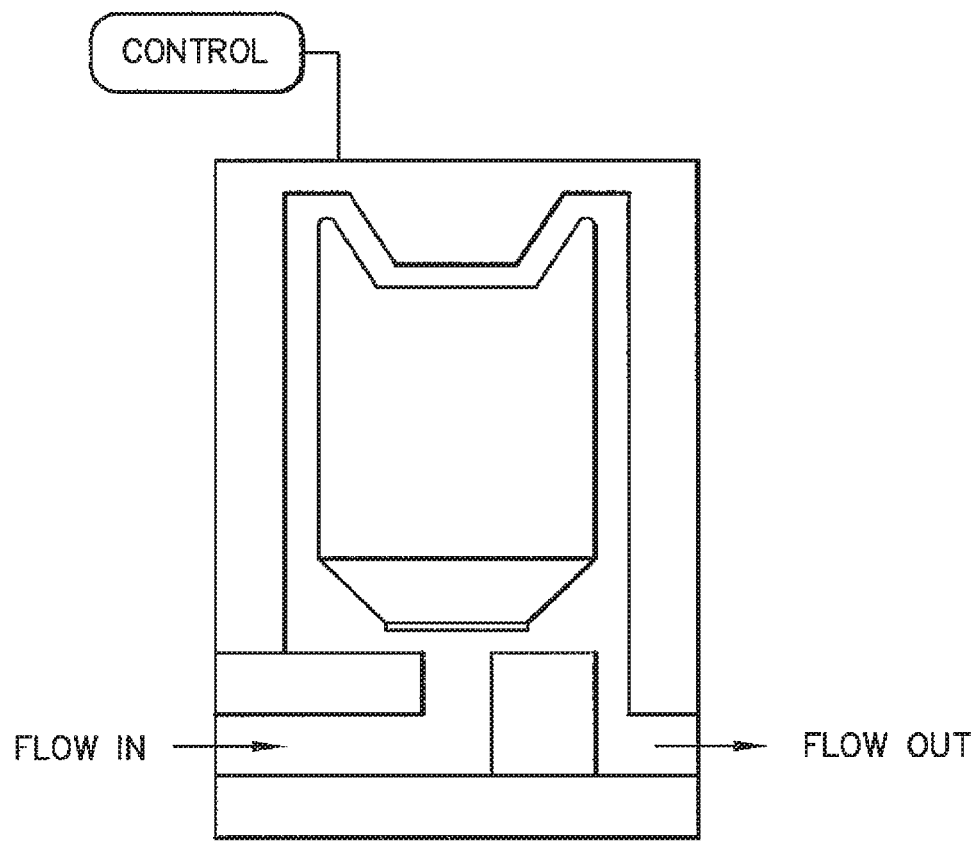
FIG. -11-
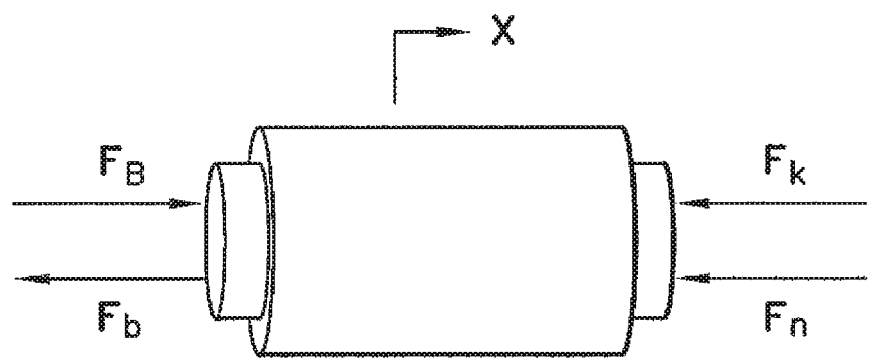
FIG. -16-

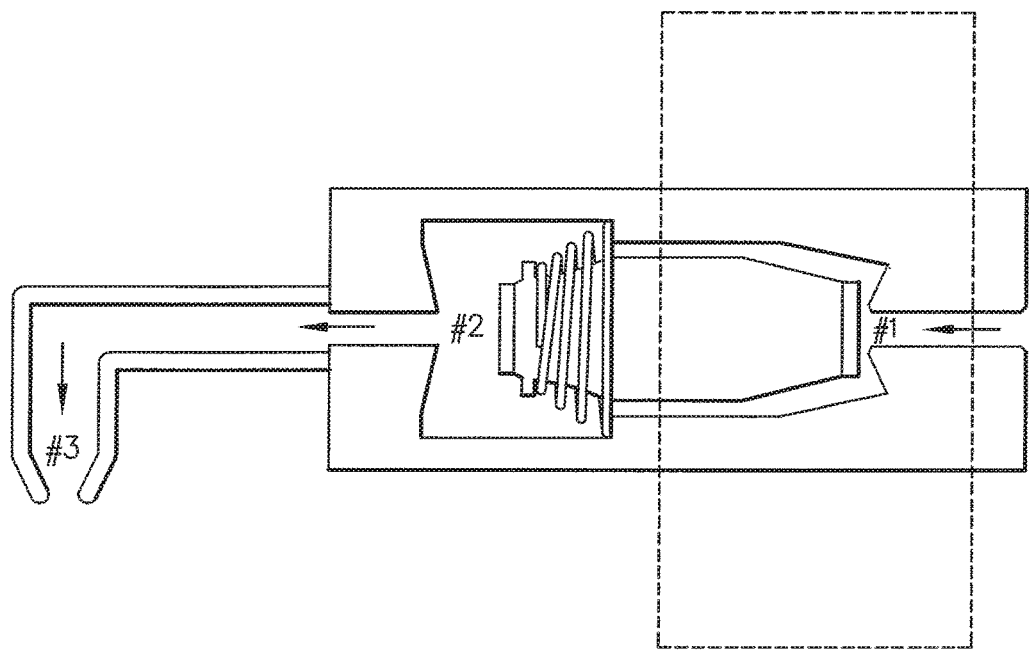
FIG. —17—

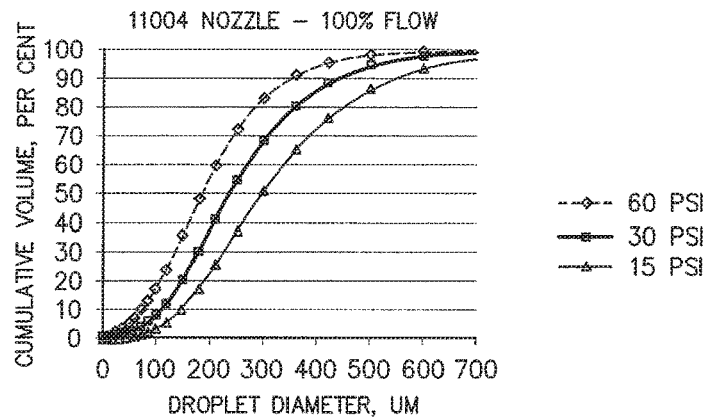
FIG. -39A-
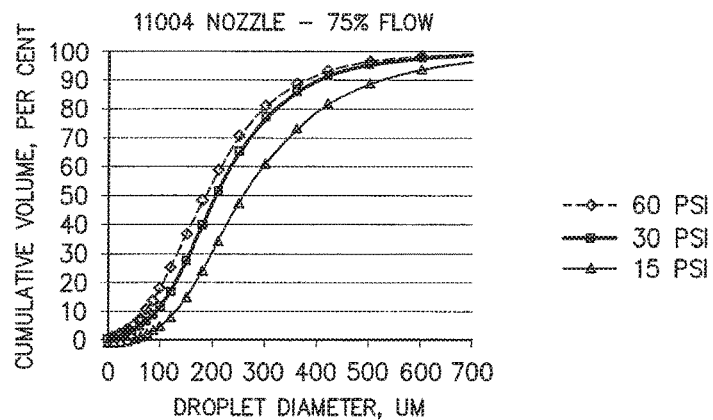
FIG. -39B-
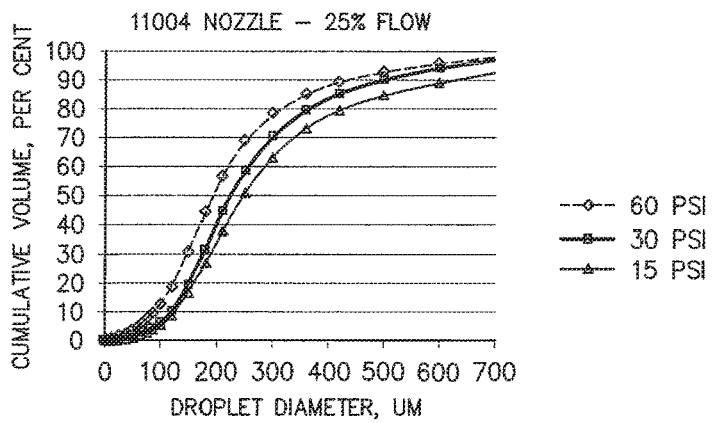
FIG. -39C-

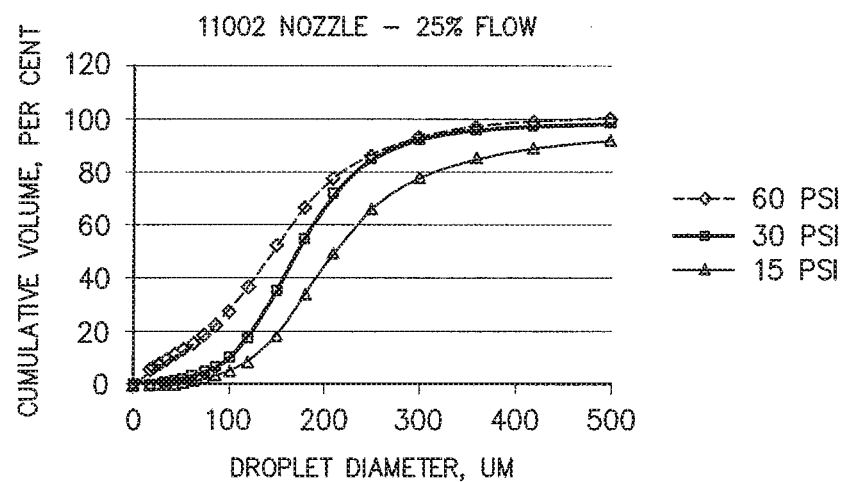
FIG. -40A-
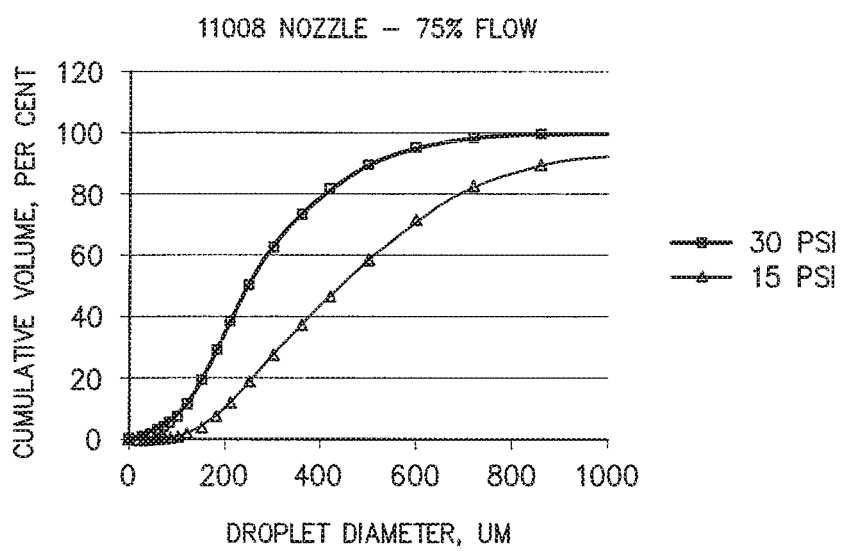
FIG. -40B-

METHODS FOR CONTROLLING OPERATION OF A VALVE

CROSS-REFERENCE TO RELATED APPLICATIONS

This application is a divisional of U.S. patent application Ser. No. 13/410,589, filed on Mar. 2, 2012, which claims priority to U.S. Provisional Patent Application No. 61/449,924, filed on Mar. 7, 2011, the disclosures of which are hereby incorporated by reference in their entirety for all purposes.

STATEMENT REGARDING FEDERALLY SPONSORED RESEARCH OR DEVELOPMENT

Certain aspects of the present invention were conceived during research funded by a USDA-CSREES-SBIR-002363 grant. The Government may have certain rights in the present invention.

FIELD

The present subject matter relates generally to the design and operation of electrically actuated valves. More particularly, the present subject matter relates to the geometry, controlling methods, diagnostics, and application of an electric solenoid valve which may be configured to simultaneously control the instantaneous pressure drop across and the duration of flow pulses through a device, such as spray nozzle used in connection with agricultural spraying systems.

BACKGROUND

In agricultural spraying, the flow rate through a spray nozzle is important in order to deliver the specified amount of active ingredient to a specified area. The proper flow rate is often a function of nozzle spacing and vehicle ground speed.

Liquid pressure across the spray nozzle can also be an important consideration. The pressure across a spray nozzle often regulates the distribution of sizes of the droplets being delivered. The distribution of droplet size and the application conditions can influence the target coverage and the occurrence of spray drift, where droplets are displaced by ambient wind and subsequently land outside of the designated spray area. Chemical type, plant canopy, and weather conditions often mandate the droplet size that is required for a particular spraying application.

Because the timing and rate of fluid flow and the desired pressure are derived from different parameters, the ability to control flow rate and pressure independently would be very advantageous. Specifically, the ability to quickly and precisely control the application rate and droplet size, at a high degree of spatial resolution, is important in achieving optimal pest control and environmental protection. Moreover, agricultural spraying is typically a low-margin business, as the spraying components used are often very expensive. Thus, the control of both instantaneous pressure and average flow rate using minimal components, such as by using a single actuator, would be desirable.

Typical liquid agrochemical application systems pressurize liquid from a reservoir and atomize the pressurized liquid streams into droplets through the spray nozzles. Spray nozzles may be selected to provide a range of droplet sizes, distribution patterns, and flow rates for a desired liquid application. Additionally, the pressure of the liquid supplied to the spray nozzles is typically regulated system-wide with an in-line or bypass valve, or through pump speed control. Moreover, in many conventional spraying applications, the pressure at an individual spray nozzle is considered only as it relates to the desired flow rate, wherein the flow rate is proportional to the square root of pressure. Consequently, large changes in pressure are required to make moderate flow rate changes. Also, the pattern or spatial distribution of the spray emitted from a spray nozzle is affected by the liquid pressure. A decrease in pressure will increase the droplet size and decrease the size of the spray pattern and the overlap of the spray patterns between nozzles. Often, at low pressures the pattern does not fully develop. This can result in incomplete coverage or excess coverage in portions of the same field.

Pulse width modulation (PWM) of the liquid supplied to each spray nozzle is an alternative to system pressure variation for flow control and is now a mature technology adopted in the U.S., Canada, and Australia. For example, known applications for PWM flow control systems are disclosed in U.S. Pat. No. 5,134,961 (Giles et al.), U.S. Pat. No. 5,653,389 (Henderson et al.), U.S. Pat. No. 7,311,004 (Giles) and U.S. Pat. No. 7,502,665 (Giles et al.) and U.S. Pat. Pub. Nos. 2006/0273189 (Grimm et al.) and 2010/0032492 (Grimm et al), all of which are hereby incorporated by reference herein in their entirety for all purposes.

In a PWM flow control system, the fluid pressure is essentially held constant at a desired value to achieve the desired droplet size spectrum and the fluid flow is interrupted in a continuously cyclic timed sequence by an actuator positioned at the nozzle inlet. Studies have shown that changes to droplet size distributions of modulated sprays are negligible and that PWM flow control methods may be used as a form of droplet size control. Because PWM flow control systems allow for flow rate changes at constant pressures, manipulation of the system pressure essentially acts as a system-wide droplet size controller.

Increasing efficiency in agricultural spray operations has trended toward machines with wider spray swaths and faster ground speeds. A side effect of these increased efficiencies is that very wide spray booms exaggerate application rate errors. One example of these rate errors exists if the spray boom is executing a turn. The spray nozzles on the inside of the turn travel slower than the spray nozzles at the distal end of the boom. Thus, some areas receive more material than desired resulting in higher chemical residues, crop damage, and wasted pesticide while other areas receive less material and a loss of pest control.

One of the advantages of modern PWM flow control systems is the capability of individual nozzle rate control due to the actuator positioned at each spray nozzle. The control of rate at per-nozzle resolution results in fewer application rate errors due to the ability to make adjustments to the rate at the highest possible spatial resolution. However, the quality of an application is dependent on numerous factors in addition to the quantity of material applied. Specifically, droplet size remains an important ingredient in maximizing efficacy and minimizing drift. Unfortunately, even with modern PWM flow control systems, droplet size is controlled in per-machine width resolution, that is, every nozzle across the entire boom must produce the same droplet size spectrum. There are many situations where adjusting the droplet size on an individual nozzle may be desirable, including use in narrow buffer zones where a larger droplet size is mandated for mitigating spray drift. With current technology, a spray machine with a 120-foot boom is required to maintain large droplets on a 120-foot swath, even if the mandated buffer zone is only 10 feet. This application would reduce the efficacy of the application in areas not at risk of drift. Modern global positioning systems with centimeter-scale accuracy and high-speed computers are capable of implementing very precise applications for diverse crops in close proximity. To gain full use of these sensor and processing technologies, the need for high treatable spatial resolution is increasing. However, one of the primary limitations to precision agricultural technology is the lack of high-quality actuation systems to match the precision of today's advanced sensing systems. Accordingly, there is a need for a system that can provide uniform spray distribution with individual control of flow rate and droplet size distribution of the spray emitted from each spray nozzle.

U.S. Pat. Pub. No. 2008/0230624 (Giles and Needham), which is hereby incorporated by reference herein in its entirety for all purposes, discloses a spray actuator that controls the flowrate of liquid through a valve and the pressure drop across the valve during the instantaneous flow. While this spray actuator provided a basic idea for instantaneous pressure and average flow control, significant improvements in actuator form and function are needed. To illustrate, the characteristics of the spray actuator made pressure control susceptible to fluctuating supply voltage, fluctuating valve inlet pressure, and aging of rubber seals. In addition, the spray actuator exhibited a lack of linearity of control. Improvements to the valve geometry, control algorithms, diagnostics, and applications of the single actuator concept would be welcomed in the technology.

In light of the above highlighted design concerns in the field of agricultural spraying, a need continues to exist for refinements and improvements to address such concerns. While various implementations of spray nozzles, nozzle assemblies, spraying systems and control systems have been developed, no design has emerged that is known to generally encompass all of the desired characteristics hereafter presented in accordance with aspects of the present subject matter.

BRIEF DESCRIPTION

Aspects and advantages of the invention will be set forth in part in the following description, or may be obvious from the description, or may be learned through practice of the invention.

In several embodiments of the present subject matter, a system for controlling the flow of fluid through a device is disclosed. The system may generally include a valve and a controller in communication with the valve. The valve may generally include a guide defining an inlet and an outlet for receiving and expelling fluid, respectively. The valve may also include a solenoid coil disposed around the guide. In addition, the valve may include a poppet configured to move within the guide between a sealed position, wherein the poppet is sealed against a portion of the valve outlet or the valve inlet, and a throttling position, wherein the poppet is spaced apart a distance from the valve inlet or the valve outlet. The valve inlet and the valve outlet may be generally aligned along an axis of movement of the poppet. The controller may be configured to control a supply of current to the solenoid coil such that the poppet is displaced between the sealed position and the throttling position.

In this aspect of the present subject matter, the poppet may be sealed against a portion of the valve inlet when at the sealed position.

Also in this aspect of the present subject matter, the distance may be equal to less than 60% of a total stroke of the poppet.

Further in this aspect of the present subject matter, the controller may be configured to control the supply of current to the solenoid coil such that, when the poppet is moved to the throttling position, an outlet pressure of the valve is controlled.

Also in this aspect of the present subject matter, the controller may be configured to control the distance the poppet is spaced apart from the valve inlet or the valve outlet by driving the solenoid coil using a complex voltage waveform.

In this aspect of the present subject matter, the poppet displacement between the sealed position and the throttling position corresponds to a pulse. The controller may be configured to control a duration of the pulse of the poppet in order to control a quantity of flow through the valve.

Further in this aspect of the present subject matter, the controlled quantity of flow may relate to an average flowrate through the valve.

In this aspect of the present subject matter, the controller may be configured to control the supply of current to the solenoid coil such that the poppet is cyclically pulsed between the sealed position and the throttling position according to a predetermined duty cycle Also in this aspect of the present subject matter, at least one of the poppet and the guide may include a tapered portion at or adjacent to the valve inlet. The tapered portion may define a taper angle. The taper angle may, in some embodiments, range from about 25 degrees to about 45 degrees.

Further in this aspect of the present subject matter, the valve may also include a spring coupled between the poppet and the guide. The spring may be configured to move the poppet into a closed position against the valve outlet when the current is removed from the solenoid coil.

In this aspect of the present subject matter, the valve may be mounted to or integrated within a spray nozzle so as to form a nozzle assembly.

Also in this aspect of the present subject matter, the nozzle assembly may be installed on a spray boom.

Further in this aspect of the present subject matter, the nozzle assembly may be configured for use with a plant precursor spraying system.

In this aspect of the present subject matter, the nozzle assembly may be configured for use with a plant canopy sensing and spray system.

Also in this aspect of the present subject matter, the controller may be configured to control the supply of current to the solenoid coil so as to control both the instantaneous pressure drop across and the average flowrate through the spray nozzle.

Further in this aspect of the present subject matter, the nozzle assembly may be configured to throttle fluid flow based on the position of the poppet wherein the fluid flow relates to the application rate in a liquid fertilizer application. In this application, the on/off duration of flow may be used to achieve individual nozzle shutoff.

Alternatively in this aspect of the present subject matter, the nozzle assembly may be configured to throttle fluid flow based on the position of the poppet wherein the fluid flow relates to the application rate in an anhydrous ammonia application. In this application, the on/off duration of flow may be used to achieve individual nozzle shutoff.

Also in this aspect of the present subject matter, the nozzle assembly may be configured to throttle fluid flow based on the position of the poppet wherein the duration of the pulse of the valve controls the placement of chemical in a planting application. For example, fertilizers and pesticides may be sprayed directly on or adjacent to seed, seedling or other plant precursor placements to enhance germination and early plant development.

In this aspect of the present subject matter, the nozzle assembly may be configured to throttle fluid flow based on the position of the poppet wherein the synchronization and duration of the pulse of the valve controls the placement of chemical on or between plants in a row crop application. For example, the control of fluid flow may regulate the application rate of the chemical.

Also in this aspect of the present subject matter, the nozzle assembly may be configured to throttle fluid pressure based on the position of the poppet wherein the synchronization and duration of the pulse of the valve controls the placement of chemical on or between plants in a row crop application. For example, the control of fluid pressure may regulate the distribution of droplet size of the chemical.

Further in this aspect of the present subject matter, the valve inlet and the valve outlet may be concentrically aligned along the axis of movement of the poppet.

Additionally, in several embodiments of the present subject matter, a solenoid valve is disclosed. The valve may include a guide defining a valve inlet configured to receive fluid and a valve outlet configured to expel fluid. The valve inlet and the valve outlet may be generally aligned on an axis. The valve may also include a solenoid coil disposed around the guide. In addition, the valve may include a poppet configured to move within the guide along the axis between a sealed position, wherein the poppet is sealed against a portion of the valve outlet or the valve inlet, and a throttling position, wherein the poppet is spaced apart a distance from the valve inlet or the valve outlet. The solenoid coil may be configured to apply a force against the poppet when current is supplied to the solenoid coil such that the poppet is displaced between the sealed position and the throttling position.

Moreover, in several embodiments of the present subject matter, a method for controlling the operation of a valve is disclosed. The method may generally include receiving an input associated with a desired outlet pressure of a fluid supplied through the valve, receiving an input associated with an inlet pressure of the fluid supplied to the valve, determining, with a controller, a desired poppet displacement for the valve based on the inlet pressure and the desired outlet pressure and controlling current supplied to the valve such that the poppet is displaced between a sealed position and a throttling position, wherein a distance between the sealed position and the throttling position corresponds to the desired poppet displacement.

In this aspect of the present subject matter, the valve may be mounted to or integrated within a spray nozzle and the method may also include receiving an input associated with a size or a flow coefficient of the spray nozzle.

Also in this aspect of the present subject matter, the method may include determining orifice pressure drop ratios for a plurality of poppet displacements for the valve.

Further in this aspect of the present subject matter, the method may include determining outlet pressures for the plurality of poppet displacements based on the orifice pressure drop ratios and the inlet pressure.

Also in this aspect of the present subject matter, the step of receiving an input associated with a desired outlet pressure for a fluid supplied through a valve may include receiving an input associated with a desired spray droplet size spectrum from the spray nozzle.

In this aspect of the present subject matter, the step of determining, with a controller, the desired poppet displacement for the valve based on the inlet pressure and the desired outlet pressure may include comparing the outlet pressures to the desired outlet pressure in order to determine the desired poppet displacement Also in this aspect of the present subject matter, the method may include determining a poppet force acting on the poppet at the throttling position based on the desired poppet displacement. For instance, poppet forces may include spring forces, fluid forces and coil forces acting on the poppet. Thus, in one embodiment, the method may include determining a coil force acting on the poppet at the throttling position based on the desired poppet displacement.

Further in this aspect of the present subject matter, the method may include determining a desired coil current to maintain the poppet at the throttling position based on the coil force.

In this aspect of the present subject matter, the step of controlling current supplied to the valve such that the poppet is displaced between a sealed position and a throttling position may include supplying the desired coil current to the valve such that the poppet is moved to the throttling position.

Also in this aspect of the present subject matter, the step of controlling current supplied to the valve such that the poppet is displaced between a sealed position and a throttling position may include supplying a dithering current to the valve.

Further in this aspect of the present subject matter, the method may include analyzing the magnitude of a current ripple produced by the dithering current to determine the poppet displacement.

In this aspect of the present subject matter, the method may allow for the simultaneous control of instantaneous pressure drop across and the duration of cyclic flow pulses through the valve.

Also in this aspect of the present subject matter, the method may include cyclically pulsing the valve in order to regulate an average flowrate through the valve.

Further in this aspect of the present subject matter, the method may include analyzing system parameters, such as inlet pressure, supplied voltage to the coil, spray nozzle flow coefficient and/or the like, in order to calculate controlling parameters for throttling the valve.

In this aspect of the present subject matter, the method may include using measured coil current for closed-loop control in order to implement accelerated poppet movement and outlet pressure response of the valve.

Also in this aspect of the present subject matter, the method may include using measured coil current to predict the poppet position to be used as a diagnostic to verify valve operation.

Further in this aspect of the present subject matter, the method may include using measured outlet pressure for closed-loop control of the outlet pressure of the valve.

In this aspect of the present subject matter, the method may include using measured outlet pressure to calculate a temporally-averaged fluid flow to be used as a diagnostic to verify valve and nozzle operation.

Also in this aspect of the present subject matter, the step of controlling a current supplied to the valve such that the poppet is displaced between a sealed position and a throttling position may include controlling the current supplied to the valve such that the poppet is cyclically pulsed between the sealed position and the throttling position according to a predetermined duty cycle.

Further in this aspect of the present subject matter, the method may include pulsing the poppet along an axis of movement between the valve inlet and the valve outlet, wherein the valve inlet and the valve outlet are generally aligned along the axis of movement.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 illustrates a simplified, cross-sectional view of one embodiment of an electric solenoid valve in accordance with aspects of the present subject matter;

FIG. 2 illustrates a simplified, cross-sectional view of another embodiment of an electric solenoid valve in accordance with aspects of the present subject matter;

FIG. 3 illustrates a perspective view of one embodiment of a spraying system in which the disclosed solenoid valves may be utilized in accordance with aspects of the present subject matter;

FIG. 4 illustrates a perspective view of one embodiment of a nozzle assembly in which the disclosed solenoid valves may be utilized in accordance with aspects of the present subject matter;

FIG. 5 illustrates one embodiment of a solenoid drive circuit that may be utilized to drive the disclosed solenoid valves in accordance with aspects of the present subject matter;

FIG. 6 illustrated a simplified view of another embodiment of a spraying system in which the disclosed solenoid valves may be utilized in accordance with aspects of the present subject matter;

FIG. 7 illustrates a flow diagram of one embodiment of a method for controlling the operation of a valve;

FIG. 8 illustrates a flow diagram of one embodiment of a series of steps that may be performed when implementing the method shown in FIG. 7;

FIG. 9 illustrates a flow diagram of one embodiment of a series of steps that may be performed when implementing a method for determining the duration of coil activation needed to achieve a desired quantity of fluid flow;

FIG. 10 illustrates a flow diagram of one embodiment of a series of steps that may be performed when implementing a method for determining the duration of coil activation needed to achieve a desired geometry and quantity of fluid flow; and FIGS. 11-40B illustrate results and other information related to an experimental analysis conducted in accordance with aspects of the present subject matter.

DETAILED DESCRIPTION

Figure 12:
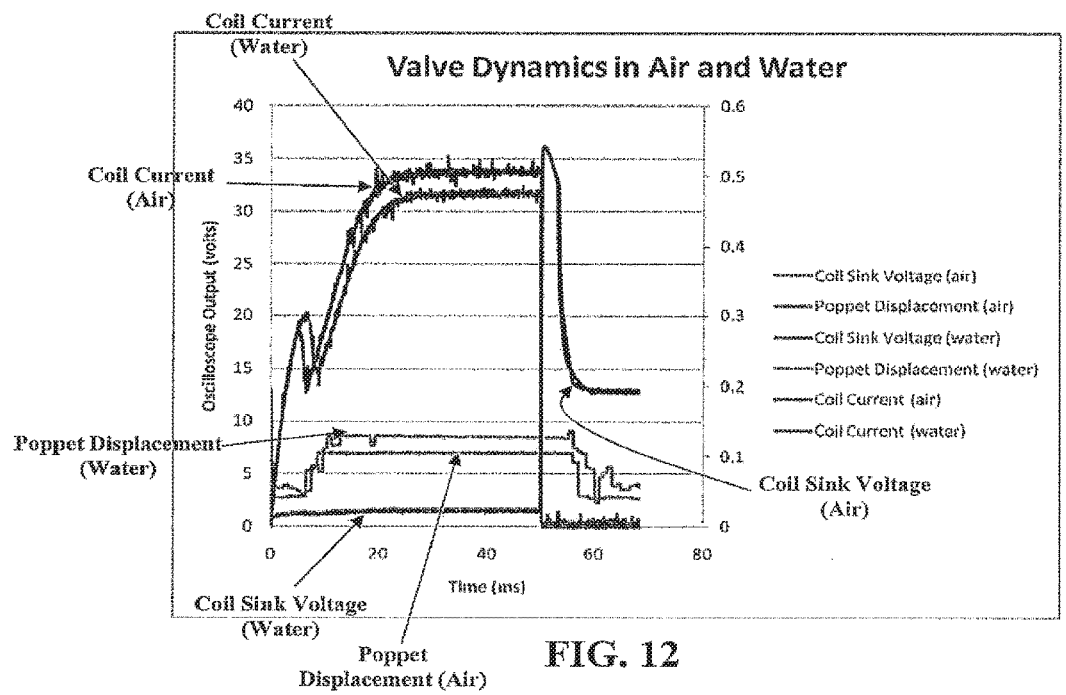

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to an electric solenoid valve that provides simultaneous control of instantaneous pressure drop across and cyclic durations of fluid flow through the valve. In several embodiments, an actuator or poppet of the valve may be configured to be pulsed within the valve such that the cyclic durations control the average flowrate through the valve. For example, the valve may be operated with a pulse-width modulation, in which the poppet moves from a sealed position to an open position relative to the valve inlet and/or valve outlet and the duty cycle of the pulse controls the average flowrate. Additionally, the pressure drop across the valve may be controlled during each pulse of the poppet by regulating the position to which the poppet is moved relative to the valve inlet and/or the valve outlet. For instance, the displacement of the poppet may be regulated such that the valve is partially opened during each pulse. In other words, the poppet may be moved to a varied throttling position resulting in varied flow coefficients. Thus, in one embodiment, by regulating the distance between the poppet and the valve inlet for each pulse, the pressure drop across the valve may be accurately controlled.

Accordingly, in several embodiments, the disclosed valve may be designed to allow the valve to be partially opened, in a precisely and reliably controllable manner during each pulse of emitted spray. In this manner, the liquid pressure drop across the valve can be controlled, thus controlling the inlet pressure to a spray nozzle (or other device) and therefore, the spray droplet size. This control, when coupled with the existing PWM-based control of the flow rate of liquid, may allow for complete control, on a nozzle-by-nozzle basis, of spray application rate and droplet size for use in agricultural spraying.

It should be appreciated that, although the disclosed valves are primarily described herein with reference to agricultural spraying systems, the valves may generally be utilized in any apparatus and/or system in which control of the instantaneous pressure drop across and/or the duration of flow pulses through a device is desired. For example, the disclosed valves may be incorporated into a device and/or system configured for triggered spraying or squirting of oil on passing railroad wheels. As another example, the disclosed device may be incorporated into a system configured to spray paint patterns on roadways and/or sports fields.

Referring now to FIG. 1, a simplified, cross-sectional view of one embodiment of an electric solenoid valve 100 is illustrated. In general, the valve 100 may include an inlet 102 and an outlet 104 for receiving and expelling fluid 106 from the valve 100. The valve 100 may also include a solenoid coil 108 (outlined by the dashed lines) located on and/or around a guide 110. For instance, in one embodiment, the solenoid coil 108 may be wrapped around the guide 110. Additionally, an actuator or poppet 112 may be movably disposed within the guide 110. In particular, the poppet 112 may be configured to be linearly displaced within the guide 110 relative to the inlet 102 and/or the outlet 104 of the valve 100. Moreover, as shown, the valve 100 may include a spring 114 coupled between the guide 110 and the poppet 112 for applying a force against the poppet 112 in the direction of the valve outlet 104. It should be appreciated that the valve 100 may also include a valve body or other outer covering (not shown) disposed around the coil 108.

As shown in the illustrated embodiment, the valve 100 is configured as an in-line valve. Thus, the fluid 106 may enter and exit the valve through the valve inlet 102 and outlet 104, respectively, along the same axis 115. In other words, the valve inlet 102 and valve outlet 104 may generally be aligned along the axis 115. Additionally, as shown in FIG. 1, in one embodiment, the inlet 102 and outlet 104 may be concentrically aligned with both one another and the positioning of the poppet 112 within the guide 110. As such, the poppet 112 may be configured to be linearly displaced within the guide 110 along the axis 115 such that the fluid 106 may generally be directed through the valve 100 along the same axis 115 as the movement of the poppet 112.

In addition, the solenoid coil 108 may be coupled to a controller 130 configured to regulate or control the current provided to the coil 108. The controller 130 may generally comprise any suitable computer and/or other processing unit, including any suitable combination of computers, processing units and/or the like that may be communicatively coupled to one another (e.g., the controller 130 may form all or part of a controller network). Thus, the controller 130 may include one or more processor(s) and associated memory device(s) configured to perform a variety of computer-implemented functions (e.g., performing the methods, steps, calculations and/or the like disclosed herein). As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) of the controller 130 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) may generally be configured to store suitable computer-readable instructions that, when implemented by the processor(s), configure the controller 130 to perform various functions including, but not limited to, controlling the current supplied to the solenoid coil 108, monitoring inlet and/or outlet pressures of the disclosed valve(s), receiving operator inputs, performing the calculations, algorithms and/or methods described herein and various other suitable computer-implemented functions.

The coil 108 may be configured to receive a controlled electric current or electric signal from the controller 130 such that the poppet 112 may be moved within the guide 110 relative to the inlet 102 and/or the outlet 104. For example, in one embodiment, the controller 130 may include a square wave generator, a coil drive circuit as shown in FIG. 5 or any other suitable device that is configured to apply a regulated current to the coil 108, thereby creating a magnetic field which attracts the poppet 112 in the direction of the valve inlet 102. As a result, the poppet 112 may be moved to a proper throttling position for controlling the pressure drop across the valve 100. Additionally, the attraction between the coil 108 and the poppet 112 may also allow the poppet 112 to be pulsated or continuously cyclically repositioned, thereby providing for control of the average flow rate through the valve 100.

In several embodiments, a modulated square wave may drive the solenoid valve 100 to control the pressure and flow rate. The duty cycle of a high-frequency modulation (e.g., at a frequency greater than about 200 Hz) may be used to regulate coil current and partially open the valve 100 by moving the poppet 112 to a particular throttling position, thereby providing a means for manipulating the outlet pressure of the fluid 106. Additionally, the low-frequency pulse duty cycle (e.g., at a frequency of less than 30 Hz) may be used to meter the average flow rate by enabling/disabling the temporally-averaged flow rate that results from the outlet pressure.

The poppet position may be regulated by the forces acting on the poppet 112, with a steady throttling position resulting from equilibrium of the forces. For example, in the illustrated embodiment, forces from the spring 114, fluid 106 and coil 108 may act on the poppet 112 simultaneously. Specifically, the forces from the spring 114 and the fluid 106 tend to bias the poppet 112 in the direction of the valve outlet 104 while the force from the coil 108 tends to bias the poppet 112 in the direction of the valve inlet 102.

Thus, when the valve 100 is unpowered (i.e., when a voltage is not applied across the coil 108), the spring 114 may force the poppet 112 towards the valve outlet 104 such that the increased system pressure has a tendency to force the valve 100 into a sealed or closed position. In such an embodiment, the poppet 112 may include a rubber disk or any other suitable sealing member 116 configured to press against an outlet seat 118 of the valve outlet 104 to create a leak-free seal on the valve 100 when the valve 100 is in the closed position. Additionally, when the valve 100 is powered (i.e., when a voltage is applied to the coil 108), the poppet 112 may be attracted by the coil 108 toward the valve inlet 102 such that the poppet 112 is moved to the throttling position. Specifically, the current supplied to the coil 108 may be controlled such that the force acting on the poppet 112 by the coil 108 is sufficient to position the poppet 112 a predetermined distance 120 from an inlet seat 122 of the valve inlet 102, thereby allow the pressure across the valve 100 to be throttled.

It should be appreciated that the particular distance 120 from the inlet seat 122 (also referred to herein as the "poppet displacement") at which the poppet 112 is positioned may generally vary depending on the desired outlet pressure for the valve 100. However, given the configuration of the disclosed valve 100, the distance 120 may always be less than the total stroke of the poppet 112 (defined as the summation of the distance 120 and a distance 132 between the poppet 112 and the outlet seat 116). In several embodiments, the distance 120 may be less than 60% of the total stroke of the poppet 112, such as less than 50% of the total stroke of the poppet 112 or less than 40% of the total stroke of the poppet 112.

In several embodiments, when the valve 100 is being pulsed, the movement of the poppet 112 may be cycled between the throttling position and a sealed position, wherein the poppet 112 is sealed against the valve inlet 102. Thus, as shown in FIG. 1, the poppet 112 may also include a rubber disk or other suitable sealing member 134 that is configured to be pressed against the inlet seat 122 of the valve inlet 102 so as to create a leak-free seal when the valve 100 is in the sealed position. In such an embodiment, in order to transition the valve 100 from the closed position (wherein the poppet 110 is sealed against the valve outlet 104) to the sealed position (wherein the poppet 110 is sealed against the valve inlet 102), the solenoid may be initially turned on with a 100% high frequency duty cycle so as to move the poppet 110 from the valve outlet 104 to the valve inlet 102 as quickly as possible. Subsequently, the current supplied to the coil 108 may be controlled such that the poppet 100 may be cyclically pulsed between the sealed position and the throttling position. However, in alternative embodiments, the valve 100 may be configured to be pulsed between the closed position (wherein the poppet 110 is sealed against the valve outlet 104) and the throttling position.

It should be appreciated that the sizes of the valve inlet 102 and valve outlet 104 (e.g., diameter 124 and diameter 126, respectively), as well as the geometry and/or configuration of the poppet 112 and the valve guide 110, may be chosen such that the force acting on the poppet 112 from the coil 108 may overcome the fluid forces and spring forces for every throttling position within the total stroke of the valve 100 when the coil is fully powered. Similarly, in one embodiment, the spring 114 may be sized such that the spring force corresponds to the minimal amount of force required to maintain a drip-free valve 100 when the valve 100 is unpowered.

In several embodiments, the poppet 112 and/or the valve guide 110 may include a tapered portion at and/or adjacent to the valve inlet 102. Specifically, as shown in FIG. 1, both the poppet 112 and the valve guide 110 include a tapered portion defining a taper angle 136 at and/or adjacent to the valve inlet 102. In several embodiments, the taper angle(s) 136 may range from about 25 degrees to about 45 degrees, such as from about 25 degrees to about 40 degrees or from about 27 to about 35 degrees and all other subranges therebetween. However it is foreseeable that, in alternative embodiments, the taper angle(s) 136 may be less than about 25 degrees or greater than about 45 degrees.

As indicated above, the solenoid coil 108 may be driven with a complex pulsed voltage waveform. A "pulse" may correspond to a duration (e.g., a 100 millisecond cycle) in which a low frequency duty cycle value sets the amount of on/off time. The "on" time may correspond to a "coil discharging (or charging) period" in which the drive voltage is turned off (on) continuously and a "modulated period" in which the voltage is turned on and off at a high frequency (e.g., at a frequency of greater than 200 Hz). The duration of the coil discharging (charging) period may be determined by the amount of time for the coil current to reach the desired value. The coil current may be continuously measured and compared to a threshold in order to trigger switching of the drive voltage to a modulated signal.

Referring now to FIG. 2, a simplified, cross-sectional view of another embodiment of an electric solenoid valve 200 is illustrated. In general, the valve 200 may be configured similarly to the valve 100 described above with reference to FIG. 1 and, thus, may include many or all of the same components. For example, the valve 200 may include an inlet 202 and an outlet 204 for receiving and expelling a fluid 206 from the valve 200. Additionally, the valve 200 may include a solenoid coil 208 (outlined by the dashed lines) located on and/or around a guide 210 and a poppet 212 movably disposed within the guide 210. The solenoid coil 208 may be configured to receive a controlled electric current or electric signal from a controller 230 such that the poppet 212 may be moved within the guide 210 relative to the inlet 202 and/or the outlet 204. Moreover, the valve 200 may include a spring 214 coupled between the guide 210 and the poppet 212 for applying a force against the poppet 212 in the direction of the valve outlet 204. It should be appreciated that the valve 200 may also include a valve body or other outer covering (not shown) disposed around the coil 208.

However, in contrast to the in-line valve 100 described above, the illustrated valve 200 is configured as a counter flow valve. Thus, the fluid 206 may be configured to enter and exit the valve 200 along differing axes. For example, as shown, the valve outlet 204 may generally be aligned with the axis of movement of the poppet 212 and the valve inlet 202 may be offset from such axis, such as by being disposed above the valve outlet 204.

Additionally, in one embodiment, the poppet 212 may be configured to include a projection 228 (e.g., a section of the poppet 212 being reduced in size) extending outwardly in the direction of the valve outlet 204. For example, as shown in FIG. 2, the projection 228 may extend outwardly from the portion of the poppet 212 configured to be sealed against the outlet seat 218 of the valve outlet 204 (e.g., a rubber disk or any other suitable sealing member 216). In such an embodiment, it should be appreciated that the projection 228 may be sized so that it may be received within a portion of the valve outlet 204 when the poppet 212 is moved towards the outlet seat 218. For instance, the projection 228 may have a diameter 231 that is smaller than the diameter 226 of the valve outlet 204.

Thus, in several embodiments of the present subject matter, the projection 228 may be configured to be received within a portion of the valve outlet 204 such that a partial opening of the valve 200 generates a constant flow coefficient. For example, a partial opening of the valve 200 may correspond to when the poppet 212 is moved to a position within the guide 210 such that at least a portion of the projection 228 is received within the valve outlet 204 and the difference of cross-sectional area between the outlet 204 and the projections 228 creates a fixed value.

Additionally, the length of the projection 228 may be configured such that, when the valve 200 is fully opened, a constant flow coefficient is achieved that is of a greater value than the constant flow coefficient achieved with the partial opening. For instance, the position of the poppet 212 shown in FIG. 2 may correspond to a fully opened position, wherein no portion of the projection 228 is disposed within the valve outlet 204. The resulting valve configuration generally has three controlled states: a closed state (e.g., a sealed position), partially open state with a low flow coefficient (e.g., the throttling position), and fully open state with a high flow coefficient.

It should be appreciated that, similar to the valve 100 described above, the partially open state may be achieved by controlling the forces acting on the poppet 212. For example, a regulated amount of voltage may be applied to the coil 208 (generating a regulated amount of coil current through the coil 208) such that the forces acting on the poppet 212 by the coil 208, spring 214 and fluid 206 are in an equilibrium state when the poppet 212 is located at the desired throttling position. In such an embodiment, the resulting distance 232 between the sealing member 216 and the outlet seat 218 and/or the volume of the outlet occupied by the projection 228 may be chosen so as to throttle the pressure across the valve 200.

In alternative embodiments, the illustrated valve 200 may not include the projection 228 shown in FIG. 1. For instance, the valve 200 may be configured similarly to the valve shown in FIG. 11. Thus, instead of controlling the position of the poppet 212 such that the projection 228 is received within the valve outlet 204, the partially open state may be achieved by simply controlling the distance 232 defined between the sealing member 216 and the outlet seat 218 in order to locate the poppet 212 at the desired throttling position.

It should be appreciated that, generally, the disclosed solenoid valves 100, 200 may be utilized to control the instantaneous pressure drop across and the cyclic duration of flow through any suitable device. However, in several embodiments of the present subject matter, the solenoid valves 100, 200 may be used to control the instantaneous pressure drop across and the cyclic duration of flow through an agricultural spray nozzle. In such embodiments, the disclosed solenoid valves 100, 200 may configured as part of a nozzle assembly for use with various agricultural spraying systems.

For example, FIGS. 3 and 4 illustrate embodiments of a spraying system 300 and a nozzle assembly 302 in which the disclosed solenoid valves 100, 200 may be advantageously used. As shown in FIG. 3, the spraying system 300 may include a tractor 304 having a cab 306, a plurality of wheels 308, at least one boom wheel 308B for engaging a section of ground with a crop, produce, product or the like (generally, 310), a tank or reservoir 312, and a spray boom 314 with a plurality of nozzle assemblies 302 installed thereon. The tank 312 may hold a liquid, a mixture of liquid and powder and/or any other suitable product designated in general by 316. For example, the liquid can be a quantity of water or an agrochemical such as a fertilizer or a pesticide. Likewise, the liquid-powder mixture can be the agrochemical. Thus, the product 316 may be sprayed from the nozzle assemblies 302 onto a crop or product or the ground 310 itself.

As shown in FIG. 4, each nozzle assembly 302 may generally include a spray nozzle 324 and a solenoid valve 320. In several embodiments, the spray nozzle 324 may include a nozzle body 322 configured to receive the product 316 flowing through the spray boom 314 and a nozzle head 326 mounted to and/or formed integrally with the nozzle body 322 for expelling the product 316 from the nozzle assembly 302 onto crops, product and/or the ground 310. It should be appreciated that the spray nozzle 324 may generally comprise any suitable spray nozzle known in the art.

The solenoid valve 320 may generally be configured the same as or similar to the valves 100, 200 described above with reference to FIGS. 1 and 2. In addition, the solenoid valve 320 may be configured to be mounted to and/or integrated within a portion of the spray nozzle 324. It should be appreciated that solenoid valve 320 may be mounted to and/or integrated within a portion of the spray nozzle 324 using any suitable mounting configuration and/or any other suitable configuration known in the art that permits the flow of product 316 through a spray nozzle 324 to be modified using PWM technology. For example, the solenoid valve 320 may be mounted to the exterior of the nozzle body 322, such as by being secured to the nozzle body 322 through the nozzle's check valve port. Alternatively, the solenoid valve 320 may be integrated within a portion of the nozzle body 322.

As another example, FIG. 6 illustrates a simplified view of a further embodiment of an agricultural spraying system 10 in which the disclosed solenoid valve(s) 100, 200 may be advantageously used. In general, the system 10 may be designed to be coupled to a piece of farming equipment (not shown), such as the tractor 304 shown in FIG. 3. The system 10 may include a seed tube 12 for dropping seeds 14 on the ground 16 as the system 10 moves at a speed V relative to the ground 16. The seeds 14 may be supplied to the seed tube 12 from a suitable seed source 18 (e.g., a seed hopper). A seed sensor 20 may be operatively connected to the seed tube 12 for detecting each seed 14 as it drops through the seed tube 12. Additionally, the seed sensor 20 may be communicatively coupled to a controller 22 (e.g., the controller 130, 230 described above). As such, each time the seed sensor 20 detects a seed 14 dropping through the seed tube 12, a signal may be transmitted from the seed sensor 20 to the controller 22.

Additionally, the system 10 may also include a nozzle assembly 24 for spraying each seed 14 with a metered amount of fluid F. Similar to the nozzle assembly 302 described above, the nozzle assembly 24 may include a spray nozzle 26 and a solenoid valve 28. The spray nozzle 26 may generally comprise any suitable spray nozzle known in the art. In addition, the solenoid valve 28 may generally be configured the same as or similar to the valves 100, 200 described above with reference to FIGS. 1 and 2 and may be mounted to and/or integrated within a portion of the spray nozzle 26 using any suitable mounting configuration and/or any other suitable configuration known in the art that permits the flow of fluid F through a spray nozzle 26 to be modified using PWM technology.

As shown in FIG. 6, fluid F may be supplied to the nozzle assembly 24 from a suitable fluid source 30 (e.g., a fluid tank). In addition, the valve 28 of the nozzle assembly 24 may be communicatively coupled to the controller 22. Accordingly, when the nozzle assembly 24 becomes aligned with the location of one of the seeds 14, the controller 22 may transmit a suitable signal to the valve 28 to cause it to open to a specific throttled position, remain open for a calculated duration, and close, thereby spraying a metered amount of fluid F on or adjacent to the seed 14. The throttling of the valve 28 may control the application rate, while the duration of the pulse may control the timing of the spray. Specifically, the duration of the pulse may correspond to the length of the deposited spray along the direction of travel of the system 10 and the synchronization of the pulse and the seed drop may determine the relationship of the location of the deposited spray to the location of the seed.

It should be appreciated that the controller 22 may be configured to determine when to open and close the valve 28 based on various inputs received by the controller 22. For example, based on inputs received from the seed sensor 20, inputs related to the speed V of the system 10, inputs from the pressure of the fluid, and inputs of the desired application rate and application geometry, the time delay necessary between the time the seed sensor 20 detects a seed 14 and the time that the valve 28 should be opened to spray fluid F on or adjacent to the seed 14 may be determined.

It should be appreciated that, although the system 10 is described above with reference to spraying seeds, the system 10 may generally be utilized to spray any suitable type of plant precursors, such as seeds, seedlings, transplants, encapsulated tissue cultures and/or any other suitable plant precursors.

It should also be appreciated that the disclosed valves 100, 200 (and the disclosed nozzles assemblies 24, 302) may similarly be used in plant canopy sensing and spray applications. For instance, instead of receiving signals from a seed sensor 20, the controller 22 may be configured to receive signals from a canopy sensor (not shown) designed to detect the presence of a plant. The controller 22 may then control the valve 28 based on such signals in order to spray a metered amount of fluid on or between plants.

Referring now to FIG. 5, one embodiment of an electric solenoid drive circuit 500 that may be utilized to drive the disclosed solenoid valves 100, 200 and/or that may form all or part of the disclosed controllers 130, 230 is illustrated in accordance with aspects of the present subject matter. In general, the circuit 500 may be configured to generate a waveform for a solenoid valve and may also be configured to measure the solenoid coil current. In one embodiment, the circuit 500 may include a field-effect transistor 502 with an input waveform 504 to connect/disconnect a supply voltage 532 to a solenoid coil 508. In addition, the circuit 500 may include current sense resistor 520 configured to generate a sense voltage 530 directly indicating the current through the resistor 520. A current feedback switch 510 may enable a feedback diode 512 to allow current in solenoid coil 508 to remain nearly constant during a high frequency modulation of waveform 504. The feedback switch 510 may disable the feedback diode 512 at the beginning or end of a low-frequency pulse to force a more rapid coil current change. It should be appreciated that solenoid coils 108, 208 in valves 100, 200 may be utilized as the solenoid coil 508 in circuit 500.

Alternatively, any other suitable drive circuit that is capable of controlling the current through a solenoid valve may be utilized to drive the disclosed valves 100, 200. For example, in several embodiments, it may be desirable to utilize a field-effect transistor (FET) with suitable gating control as the current feedback switch 510 described above. By utilizing a FET as a current feedback switch, the drive circuit 500 may be capable of changing coil current more quickly, thereby providing increased valve response. In particular, the FET may be utilized to enable and disable the feedback diode 512, such as by enabling the feedback diode 512 during high-frequency modulation and disabling the feedback diode 512 during low frequency valve transitions. The enabled feedback diode 512 may allow for current throttling through the use of a high-frequency PWM duty cycle while the disabled feedback diode 512 may allow for accelerated dynamic response of the valve, thereby providing the ability to both modulate the coil voltage for coil current control and force rapid current deceleration during low-frequency valve transitions.

It should be appreciated that the present subject matter is also directed to various algorithms or methods for operating and/or actuating an electric solenoid valve (e.g., the solenoid valves 100, 200 described above). In general, the methods may allow for the simultaneous control of instantaneous pressure drop across and a controlled duration of flow through any suitable device, such as the nozzle assemblies 302, 24 described above.

Referring to FIG. 7, in several embodiments, the present subject matter discloses a method 700 for controlling the operation of a valve. As shown, the method may generally include receiving an input associated with a desired outlet pressure of a fluid supplied through the valve 702, receiving an input associated with an inlet pressure of the fluid supplied to the valve 704, determining, with a controller, a desired poppet displacement for the valve based on the inlet pressure and the desired outlet pressure 706 and controlling current supplied to the valve such that a poppet of the valve is pulsed between a sealed position and a throttling position.

In general, the illustrated method 700 may be used to determine both the poppet displacement (e.g., distance 120, 232) and coil current needed to achieve a steady state outlet pressure for a solenoid valve (e.g., the valves 100, 200). In particular, by analyzing various system parameters, a controller (e.g., the controller 130, 230) may be utilized to determine the distance a valve poppet is to be positioned from the valve inlet and/or outlet in order to achieve a desired outlet pressure for the valve (e.g., by using an iterative process). This poppet displacement value may be used to calculate the coil current required to the throttle the outlet pressure to the desired value. The coil current may then allow the controller to set the coil discharging (or charging) period and high-frequency modulation duty cycle for the valve.

It should be appreciated that, in addition (or as an alternative) to receiving the desired outlet pressure as an input, the desired spray droplet size spectrum may be received as an input. As is generally understood by those of ordinary skill in the art, the desired spray droplet size spectrum may be correlated to the desired outlet pressure based on the particular type of spray nozzle being used (e.g., the orifice size and design of the spray nozzle). Thus, in one embodiment, the disclosed system may be configured to receive the desired spray droplet size spectrum as an input and, based on such input, analyze the outlet pressure-droplet size relationship to calculate the desired valve outlet pressure (i.e., the desired spray nozzle inlet pressure). Accordingly, it should be appreciated that, when the disclosed system and/or methods are described herein as using, determining and/or producing a desired outlet pressure, the system and/or methods may also be using, determining and/or producing a desired spray droplet size spectrum.

Referring now to FIG. 8, a flow diagram of one embodiment of a series of steps that may be implemented by the controller (e.g., controller 130, 230) of a spraying system (e.g., system 300, 10) when executing the disclosed method 700 is illustrated in accordance with aspects of the present subject matter. As shown, in 802, inputs associated with system parameters may be received by the controller. For instance, in one embodiment, the particular size or flow coefficient of the spray nozzle (e.g., spray nozzle 324, 26) being used may be input into the controller. In addition, the desired outlet pressure for the valve (or the desired spray droplet size spectrum from the spray nozzle) may also be input into the controller. Moreover, various other system parameters may also be input into the controller, such as a desired flow rate, flow duration, coil resistance, other coil parameters and/or the like. It should be appreciated that, in one embodiment, such inputs may correspond to operator inputs provided by the operator of the spraying system.

In 804, the controller may be configured to calculate orifice pressure drop ratios for a plurality of varied poppet displacements of the valve. Specifically, in several embodiments, the controller may be configured to model multiple orifices in series and use known orifice equations to calculate orifice pressure drop ratios (i.e., the ratio of pressure drop across the valve and the valve inlet pressure) for various modeled poppet displacements based on the size or flow coefficient of the spray nozzle received as an input in 802. For instance, as will be described below with reference to FIG. 16, such lookup values may be determined by modeling a nozzle assembly (i.e., a valve and spray nozzle combination) as three orifices in series (e.g., an inlet orifice (#1), an outlet orifice (#2) and a spray nozzle orifice (#3)).

Additionally, in 806, the high-frequency PWM for the valve may be set to a predetermined percentage at the beginning of a valve pulse. Specifically, in several embodiments, the controller may be configured to set the high-frequency PWM to 0% (or 100% for coil charging) at the beginning of the valve pulse. For instance, in the embodiment shown in FIG. 1, the controller may be configured to set the high-frequency PWM to 0% to permit the poppet to move from the sealed position (wherein the poppet is sealed against the valve inlet) toward the throttling position. Additionally, in one embodiment, the controller may also be configured to open a current feedback switch or FET of the drive circuit controlling the valve (e.g., current feedback switch 510 of drive circuit 500) at the beginning of the valve pulse.

Referring still to FIG. 8, in 808, the controller may be configured to measure the voltage being supplied to the drive circuit (e.g., drive circuit 500) or the valve. The measured voltage may then be utilized to calculate the maximum coil current for the solenoid coil. For instance, in one embodiment, the measured voltage may be divided by the coil resistance to determine the maximum coil current.

Additionally, in 810, the controller may be configured to measure the inlet pressure of the fluid supplied to the valve. For example, in several embodiments, one or more pressure transducers or other suitable pressure sensors may be disposed at the valve inlet or at a location upstream of the valve inlet. In such embodiments, the controller may be communicatively coupled to the pressure transducer(s)/sensor(s) and, thus, may be configured to receive signals associated with the inlet pressure of the valve. The inlet pressure may then be utilized to determine the resulting outlet pressures for the varied modeled poppet displacements. For instance, in one embodiment, the measured inlet pressure may be multiplied by the orifice pressure drop ratios calculated in 804 in order to determine the resulting outlet pressures for the varied poppet displacements. The outlet pressures determined in 810 may then, in 812, be compared to the desired outlet pressure in order to determine the desired poppet displacement. In particular, by selecting the outlet pressure closest to the desired outlet pressure and/or be interpolating between outlet pressures, the desired poppet displacement may be determined.

Moreover, in 814, the desired poppet displacement from 812 may be utilized to calculate the forces acting on the poppet when the poppet is moved to the throttling position. For instance, the desired poppet displacement, together with the measured inlet pressure, may be utilized by the controller to calculate the fluid force acting on the poppet at the throttling position. In addition, the controller may also utilize the desired poppet displacement to calculate the spring force acting on the poppet. The coil force required to maintain the poppet at the throttling position may then be calculated by the controller by simply equating the sum of all the poppet forces to zero (i.e. at the equilibrium state).

Referring still to FIG. 8, in 816, the desired coil current may be calculated based on the coil force acting on the poppet at the throttling position. Specifically, by knowing various properties of the solenoid coil (e.g., coil resistance, number of turns, etc.), the coil current needed to achieve the specific coil force may be determined. Thereafter, in 818, the coil current may be continuously measured and compared to the desired coil current. In several embodiments, once the measured coil current is equal to the desired coil current, the high-frequency PWM for the valve may be set to a throttling percentage (e.g., the percentage of the desired coil current over the maximum current). As such, the valve poppet may be moved to the desired throttling position resulting from the equilibrium of forces acting on the poppet. Additionally, once the measured coil current is equal to the desired coil current, the controller may also be configured to close the current feedback switch or FET of the drive circuit controlling the valve.

In addition to the steps described above (e.g., steps 802-818), the controller may also be configured to execute various other steps. Specifically, in one embodiment, the controller may be configured to receive signals associated with the outlet pressure of the valve in order to implement closed loop control of the outlet pressure. For instance, the controller may be communicatively coupled to one or more pressure transducers and/or other suitable pressures sensors positioned at the valve outlet and/or at a location downstream of the valve outlet. In such an embodiment, gains may be multiplied by the desired coil current or the high-frequency PWM duty cycle such that the controller may adjust the outlet pressure of the valve. Additionally, in another embodiment, the controller may be configured to use flow rate measurements to implement closed-loop control of the temporally-averaged spray nozzle flow. For instance, an application rate controller may provide a gain which is multiplied by the desired coil current or the high-frequency PWM duty cycle so that the controller may be configured to appropriately adjust the outlet pressure of the valve.

Moreover, the present subject matter is also directed to a method for determining the duration of coil activation needed to achieve a desired quantity of fluid flow. It should be appreciated that, if an application rate per unit area is desired, the desired quantity of flow per pulse may be calculated as a mass or volume to be applied within a set period. Regardless, nozzle velocity, nozzle swath width, desired application rate, and period length may be used to calculate the desired quantity of flow.

For example, one embodiment of a series of steps that may be utilized by the controller of a spraying system to implement such a method is illustrated in FIG. 9. As shown, in 902, inputs associated with system parameters may be received by the controller. For instance, in one embodiment, the particular size or flow coefficient of the spray nozzle (e.g., spray nozzle 324, 26), the desired outlet pressure for the valve, the desired application rate (per area) and/or various other suitable system parameters may be input into the controller. In 904, the controller may calculate a temporally-averaged flow rate for the spray nozzle based on its flow coefficient and the desired outlet pressure of the valve. Additionally, in 906, a desired quantity of fluid flow per pulse may be determined by multiplying the desired application rate by the nozzle velocity, nozzle swath width, and pulse period length. Thereafter, in 908, the desired quantity of fluid flow per pulse may be divided by the predicted temporally-averaged flow rate to determine the desired pulse duration.

It should be appreciated that the method described with reference to FIG. 9 may also be utilized with the methods described above with references to FIGS. 7 and 8 in order to achieve a desired quantity of flow and also maintain a desired outlet pressure for the valve. For instance, once the desired pulse duration is determined (e.g., by implementing steps 902-908), the controller may be configured to move the poppet in accordance with the desired poppet displacement determined in step 812 and thereafter maintain the poppet at the desired throttling position for the desired pulse duration. It should also be appreciated that, in addition to the steps described above with reference to FIG. 9, the controller may also be configured to execute various other steps. Specifically, in one embodiment, the controller may be configured to use flow rate measurements to implement closed-loop control of the average spray nozzle flow. For instance, an application rate controller may provide a gain which is multiplied by the valve pulse duration so that the controller may be configured to appropriately adjust the average rate of flow through the valve.

Additionally, the present subject matter is also directed to a method for determining the duration of coil activation needed to achieve a desired geometry and quantity of fluid flow. It should be appreciated that, if an application rate per trigger is desired, the desired quantity of flow will remain a constant value, settable by the operator. Additionally, a constant geometry of application may be desired, also settable by the operator. One embodiment of a series of steps that may be utilized by the controller of a spraying system to implement such a method is illustrated in FIG. 10. As shown, in 1002, inputs associated with system parameters may be received by the controller. For instance, in one embodiment, the particular size or flow coefficient of the spray nozzle (e.g., spray nozzle 324, 26), the desired application rate per trigger (i.e., quantity of fluid per pulse), the desired length (e.g., displacement) of the fluid application and/or various other suitable system parameters may be input into the controller. In 1004, the desired length of the fluid application controller may be multiplied by the nozzle velocity to calculate a desired pulse duration. Additionally, in 1006, the desired application rate per pulse may be divided by the desired pulse duration in order to determine the desired temporally-averaged flow rate. In 1008, the controller may be configured to utilize the desired temporally-averaged flow rate and the spray nozzle coefficient of the spray nozzle to calculate a desired outlet pressure for the valve. The desired outlet pressure may then be utilized with the methods described above with references to FIGS. 7 and 8 in order to implement a fluid pulse with the desired pulse duration.

It should be appreciated that the method described above with reference to FIG. 10 may, in one embodiment, be advantageously used with the plant precursor squirting system 10 of FIG. 6.

By utilizing the above described methods, a solenoid valve may be throttled so as to control the pressure drop across the valve. Successful throttling of the valve may then allow for application rate and droplet size control for various applications including, but not limited to, individual nozzle control for flow rate and droplet size of pesticide spray, individual nozzle control of liquid fertilizer application rate, individual knife control of anhydrous ammonia application rate, spraying on or between seeds, seedlings and/or other plant precursors during planting applications, and triggered spraying on or between plants in row-crop chemical applications.

It should be appreciated that the above described methods/steps are simply provided as several examples of suitable methods/steps that may be implemented when throttling a solenoid valve to allow control of the instantaneous pressure drop across and the cyclic duration of flow through the valve. Thus, it should be readily apparent to those of ordinary skill in the art that the methods/steps may be modified to accommodate valves having various different configurations (e.g., in-line valves, counter flow valves, and the like) and to allow such methods/steps to be used across a wide range of spraying and related applications.

It should also be appreciated that the present subject matter is also directed to various methods related to system/valve diagnostics that may provide a means for verifying proper system/valve operation and/or for detecting malfunctioning components of the system. For instance, one of the challenges of an in-line valve design (e.g., the valve 100 shown in FIG. 1) is that proportional control of the valve may become unstable as the poppet position approaches the valve outlet. Thus, if the valve poppet mistakenly moves over-center to the closed position, the coil must be fully powered in order to pull the poppet off of the outlet seat. In this regard, U.S. Pat. No. 7,311,004 to Giles, which is hereby incorporated by reference herein in its entirety for all purposes, discloses a method of sensing a characteristic current bump for valve diagnostics in order to detect a malfunctioning valve, including one with a stuck or missing plunger. As the valve poppet moves, a bump may be detected in the current ramp resulting from changing magnetic flux in the valve. The sensing of these magnetic flux changes (current bumps) during the valve OFF/ON or ON/OFF transitions may be advantageously used with disclosed in-line valve 100 in order to allow the drive circuit to identify the occurrence of an over-center poppet.

Additionally, as the valve poppet for the disclosed valves is moved from a closed or sealed position to an open position, the present inventors have found that the inductance of the solenoid coil changes. If a dithering frequency (e.g., less than 800 Hz) is supplied to the solenoid coil for throttling the valve, a current ripple may be produced. The magnitude of the ripple may be directly related to the inductance of the solenoid coil. As a result, magnitude measurements of a dithering coil current may be used to approximate the poppet position within the valve. Accordingly, these measurements may be used to determine if and when an in-line valve poppet has gone over-center to the outlet port side of the valve. Additionally, such measurements may also allow for the detection of a missing poppet and/or a clogged valve.

Moreover, as described above, pressure measurements at or downstream of the valve outlet may, in several embodiments, be used for closed-loop control of the outlet pressure of the valve. In addition, these outlet pressure measurements may also allow for system/valve diagnostics. In particular, outlet pressure measurements taken while the poppet is at the throttling position may allow for the calculation of instantaneous fluid flow by multiplying the square-root of the outlet pressure by the spray nozzle flow coefficient. As such, deviations from the desired fluid flow values may be used to identify malfunctioning components, including clogged valves and/or clogged spray nozzles. Further, the speed of on/off pressure transitions may indicate conditions of partially clogged valves or spray nozzles.

Experimental Analysis/Results

The description that follows provides a summary of research conducted by the present inventors regarding the subject matter disclosed above. It should be appreciated that the analysis and results provided below are merely illustrative and should not be construed as any type of limitation on the scope of the disclosed subject matter.

Development of a Mathematical Model and a Prototype Valve

Proportionally acting solenoid valves were physically modeled and investigated using a test stand including a laser displacement sensor for measuring valve poppet position and motion, electrical transducers for solenoid voltage and current measurement and a series of pressure transducers for measuring inlet and outlet fluid pressure. In addition, the temporal relationship between the electrical state of the valve and the poppet motion was also measured. All the test parameters (e.g., poppet position and motion, electrical and fluid pressure conditions) were recorded simultaneously during actuation using programmable input signals. Steady state and transient models of the valve were developed and prototype components and designs indicated that variable pressure drop across the valve for each approximately 100 ms cycle was feasible.

The test fixture allowed the collection of the performance data on solenoid valves during operation at conditions approximating those expected field conditions of a product based on the design. For example, the following sequence of test data provides insight into a commercially available valve having a configuration similar to the counter-flow valve shown in FIG. 11. The valve was pulsed with a 12-volt signal at 10 Hz with a 50% duty cycle. The pulsing mechanism was a commercially available control module powered by a 12-volt supply. The module included a 1-ohm series resistor that was used to measure solenoid current.

By pulsing the valve with non-flowing air and again with non-flowing water, a difference in poppet response time due to the medium could be observed. Voltage pulses, current ramps, and poppet displacement measurements were logged with a PC oscilloscope and software. Data for a 75 ms pulse event is shown in FIG. 12. As shown in FIG. 12, coil sink voltage and poppet displacement are referenced to the left axis and coil current is referenced to the right axis. These results established the accuracy and utility of the experimental apparatus design and operation.

Figure 13:
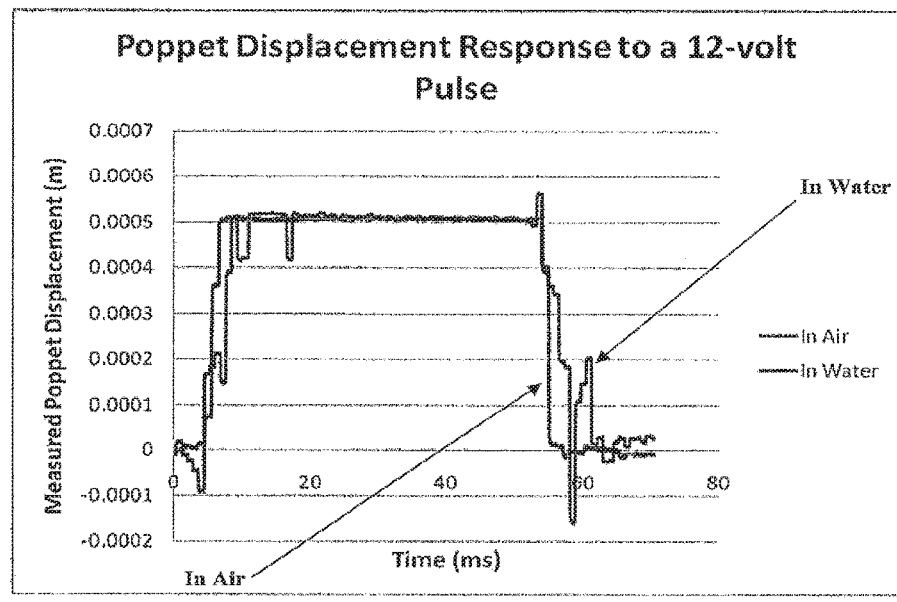

FIG. 13 shows data for a 75 ms pulse event highlighting poppet response to the opening signal. Specifically, FIG. 13 shows the laser sensor output after voltage calibrations were applied and data were time-shifted to account for a laser sensor output delay of 2 milliseconds. As shown, the data indicated that the poppet, in air, reached the fully open stop in 6.55 milliseconds. In water, the poppet reached the stop in 8.46 milliseconds. Thus, the fluid damping resulted in a response slowed by 1.91 milliseconds.

Using available commercial software packages, computer models of the valves were also created to permit computational fluid dynamics (CFD) analyses and other mathematical analyses to be performed. The computer model allowed stress, displacement, mass, center of gravity and physical parameters to be easily calculated from the physical dimensions of the valve assembly. For instance, the internal porting of the valve and the position of the poppet could be altered and the resulting flow characteristics determined. Additionally, a typical flow trajectory of fluid passing through the valve could be calculated through a CFD analysis, allowing fluid velocity, pressure and turbulence to be determined for any flow condition. This allowed the pressure drop across the valves to be determined for any displacement of poppet from the valve seat. Moreover, the results from the model allowed flow coefficients and other performance data to be developed and facilitated investigation of the resulting changes in performance for changes in valve geometry.

The dynamic simulation of the mathematical model was used to combine fluid, spring, and solenoid coil forces to predict responses of throttling actuator position and outlet pressure. A non-linear model was adopted that utilized three first-order differential equations similar to a linear state-space model.

$$\dot{x}_1 = a_{11} \cdot x_1 + a_{12} \cdot x_2 + a_{13} \cdot x_3 + b_{11} \cdot u_1 + b_{12} \cdot u_2$$

$$\dot{x}_2 = a_{21} \cdot x_1 + a_{22} \cdot x_2 + a_{23} \cdot x_3 + b_{21} \cdot u_1 + b_{22} \cdot u_2$$

$$\dot{x}_3 = a_{31} \cdot x_1 + a_{32} \cdot x_2 + a_{33} \cdot x_3 + b_{31} \cdot u_1 + b_{32} \cdot u_2$$

where:

$$\dot{x} = \frac{dx}{dt}$$

$$A = \begin{bmatrix} a_{11} & a_{12} & a_{13} \\ a_{21} & a_{22} & a_{23} \\ a_{31} & a_{32} & a_{33} \end{bmatrix}$$

$$B = \begin{bmatrix} b_{11} & b_{12} \\ b_{21} & b_{22} \\ b_{31} & b_{32} \end{bmatrix}$$

$$X = \begin{bmatrix} x_1 \\ x_2 \\ x_3 \end{bmatrix}$$

$$U = \begin{bmatrix} u_1 \\ u_2 \end{bmatrix}$$

State variables were assigned:
$x_1$=coil current
$x_2$=poppet displacement
$x_3$=poppet velocity
Inputs were assigned:
$u_1$=coil voltage
$u_2$=valve inlet pressure An iterative process allowed simulation of the system and allowed calculation of non-linear parameters within each iteration.

To verify the accuracy of the mathematical models, the first attempt compared the dynamic response of a commercially available two-way, direct-acting solenoid valve having a configuration similar to the counter flow valve shown in FIG. 11. Tests were conducted on this first valve in order to verify that the flow coefficients (gpm/(psi^0.5)) were the same as the simulation. Further tests were done isolating forces on the poppet from the spring, the fluid, and the solenoid coil. The isolated force measurements enabled completion and verification of the mathematical model.

The tests on the first valve led to a better understanding of the forces on the poppet and the poppet's relationship to the outlet pressure. With a narrowed consideration of the type of valve and the metering mechanism required, it was decided to incorporate characteristics of a different solenoid valve that had been designed for proportional pressure control in pneumatic systems.

The proportional pneumatic solenoid valve utilized a flat-faced poppet that throttled the inlet orifice similar to the "backwards ported" design of the first test valve. The poppet and poppet barrel shape differed in a way that eliminated the sensitivity of coil force to poppet displacement. Instead, the force function was made fairly linear to coil current only. Modifications were also made to the valve design to increase the coil force, reduce the fluid force, increase the poppet's range of travel, and size a spring in order to create a drip-free preload yet allowing coil force to fully open the valve.

A 13-watt coil was selected as an actuator driver. The design was such that force on the poppet from the coil acted in the same direction as the fluid force. Force on the poppet from an internal spring opposed the coil and fluid forces.

Figure 14:
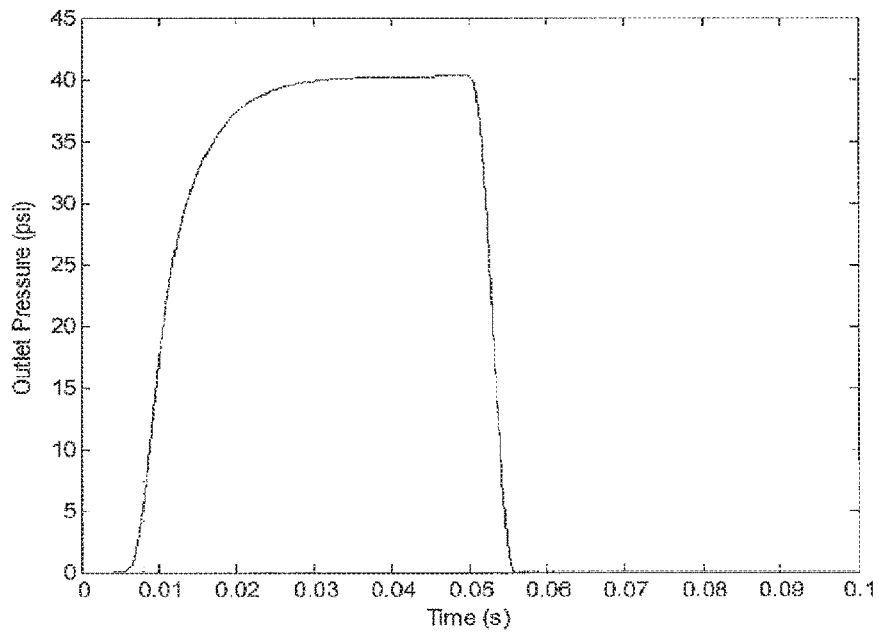

Solid modeling of the newly designed valve was performed. Response was simulated with a constant inlet pressure of 90 psi and a coil voltage square wave with 50% duty cycle and controlled magnitude. FIG. 14 displays the simulated outlet pressure response to a 10.8-volt square wave. As the graph in FIG. 14 shows, the pressure response was delayed from the initial square-wave pulse and was slow to reach its steady state value of 40 psi. This slow response demonstrated the need for a more complex drive signal than a simple square wave.

Moreover, the non-linear model described above was also utilized to predict the behavior of an in-line valve similar to the valve 100 shown in FIG. 1, wherein the fluid inlet and outlet ports were aligned on opposite ends of the moving poppet axis. The in-line valve utilized a poppet diameter of 9.70 mm. The poppet gap taper (or taper angle 136) was set to 27 degrees to maximize magnetic field force when the gap distance was 0.00178 m (farthest distance of poppet stroke). The coil used 1000 turns of 28 AWG wire. Mass of the poppet was estimated at 0.00919 kg.

System parameters for the A and B matrices of the model were determined using simulations. Non-linear matrix parameters were calculated between 50-µs step iterations. Non-linearity of the system included boundary conditions (poppet against stops), non-linear force relationships to fluid pressure and magnetic fields, and non-linear current due to changing coil inductance.

Figure 15:
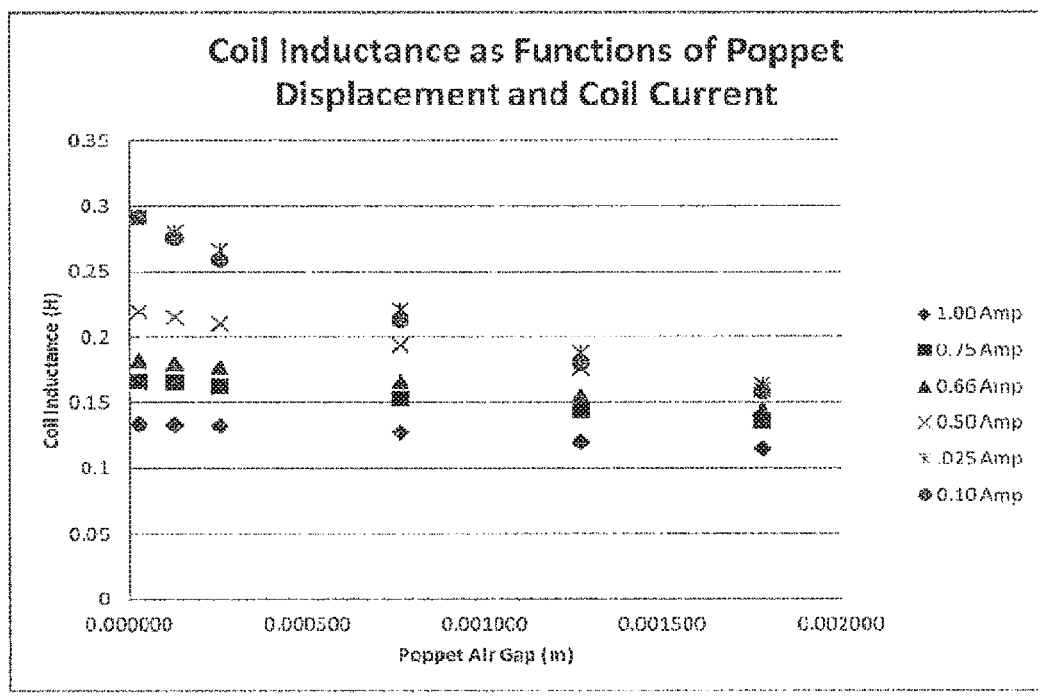

The coil for the valve was modeled as an inductor in series with a resistor. Voltage across the simple inductor and total circuit resistance related to respective current as:

$$v_L = L \cdot \dot{i}_L$$

$$v_R = R \cdot i_R$$

where L was the inductance of the coil, and R was the total circuit resistance. Simulations of the valve revealed that coil inductance was not constant, but varied as a function of both coil current (i) and poppet displacement (x) as displacement related to the air gap between the poppet and stator core. The simulation result is displayed in FIG. 15, which show the relationship of coil inductance to poppet air gap and coil current.

The complex relationship of coil inductance to coil current resembled a sigmoid with minimum and maximum values. Inductance as a function of poppet displacement also resembled a sigmoid shape with inductance asymptotes related to a core with a closed gap and a core with an infinite gap. However, because the valve operates in a limited range of both coil current and poppet displacement, inductance as a function of poppet displacement and coil current was modeled as:

$$L = \frac{L_0}{\sqrt{i_L}} + \frac{L_1 \cdot x_{GAP}}{i_L}$$

where constants $L_0 = 0.14$ and $L_1 = -15.70$ (units were: m, amps, and Henries). In cases where current $i_L < 0.25$ amps, a minimum of current of 0.25 amps will be used in the calculation of L.

Elemental coil relationships of voltage and current were related using Kirchhoff's laws:

$$v_S = v_L + v_R$$

$$i_L = i_R$$

Rearranging variables, the resulting state space parameters are:

$$i_L = \frac{v_L}{L}$$

$$i_L = \frac{v_S - v_R}{L}$$

$$i_L = \frac{-R}{L} \cdot i_R + \frac{1}{L} \cdot v_S$$

$$\dot{x}_1 = \frac{-R}{L} \cdot x_1 + \frac{1}{L} \cdot u_1$$

So, $a_{12} = 0$, $a_{13} = 0$, $b_{12} = 0$, and:

$$a_{11} = \frac{-R}{L}$$

$$b_{11} = \frac{1}{L}$$

Note that these parameters are non-linear since:

$$L = \frac{L_0}{\sqrt{x_1}} + \frac{L_1 \cdot x_{GAP}}{x_1}$$

Poppet velocity is simply the derivative of displacement. In the state space model, the derivative of displacement is expressed as:

$$\dot{x}_2 = x_3$$

So, parameters $a_{21} = 0$, $a_{22} = 0$, $a_{23} = 1$, $b_{21} = 0$, and $b_{22} = 0$.

Forces on the poppet included a spring force ($F_k$), a normal force from fluid pressure ($F_n$), a motion damping force from fluid friction ($F_b$), and a magnetic field force ($F_B$) from the solenoid coil. A free body diagram of forces acting on the valve poppet is shown in FIG. 16.

Force from the spring was related to poppet displacement (x) such that:

$$F_k = k \cdot (x + x_0)$$

where $x_0$ was the length of compression of the spring at a poppet displacement of zero. The spring constant (k) was 610 N/m with a closed-valve spring compression length of $x_0 = 0.00401$ m.

The normal force from fluid on the static poppet ($F_n$) from each orifice was a product of the fluid pressure across the orifice ($\Delta p$) and the circular area:

$$F_n = A \cdot \Delta p$$

where the area of the orifice with diameter (d) was:

$$A = \pi \cdot \left(\frac{d}{2}\right)^2$$

Pressure was acquired from modeling the valve and spray nozzle as 3 orifices in series. FIG. 17 displays a cross-sectional view of an in-line valve with numbers labeling the 3 orifices, wherein orifice #1 corresponds to the pressure throttling or valve inlet orifice, orifice #2 corresponds to the valve outlet orifice and orifice #3 corresponds to the spray nozzle orifice.

Net normal force from fluid pressure was:

$$F_n = A_i \cdot \Delta p_i + A_o \cdot \Delta p_o$$

Where $A_i$ was the area of the circular inlet, $\Delta p_i$ was the pressure across the inlet orifice (#1 from FIG. 17), $A_o$ was the area of the circular outlet, and $\Delta p_o$ was the pressure across the outlet orifice (#2 from FIG. 17).

All orifices were modeled as:

$$Q = K_V \sqrt{\Delta p}$$

where Q was the volumetric flow (l/s), $\Delta p$ was the pressure across the orifice (Pa), and $K_V$ was the flow coefficient. The fluid flow was assumed to be constant so that $Q_1 = Q_2 = Q_3$. Pressures were modeled as $\Delta p_1 + \Delta p_2 + \Delta p_3 = p_{in}$ (valve inlet pressure). Using 3 simultaneous equations, the pressure in the valve was found to be:

$$p_{valve} = \frac{K_{V1}^2}{K_{V1}^2 + K_{V2}^2 - \frac{K_{V2}^4}{K_{V2}^2 + K_{V3}^2}} \cdot p_{in}$$

and, the pressure in the nozzle was:

$$p_{nozzle} = \frac{K_{V2}^2}{K_{V2}^2 + K_{V3}^2} \cdot p_{valve}$$

The pressure throttling orifice (#1 in FIG. 17) was modeled using data collected from previous testing. The flow coefficient ($K_{V1}$) was modeled as the product of a constant metering coefficient (C=1880 l/min/Pa$^{0.5}$/m$^2$) and the metering area (m$^2$):

$$K_V = C \cdot A_{KV}$$

When the poppet was sufficiently close to the orifice, the controlling area of this disk throttling mechanism was:

$$A_{KV} = \pi \cdot d \cdot x$$

where d was the orifice diameter of 0.00397 m (5/32") and x was the distance of the poppet from the orifice. As the distance of the poppet to the orifice increased, a maximum area was used. The maximum area was the circular area of the orifice:

$$A_{KV\_MAX} = \pi \cdot \left(\frac{d}{2}\right)^2$$

Figure 18:
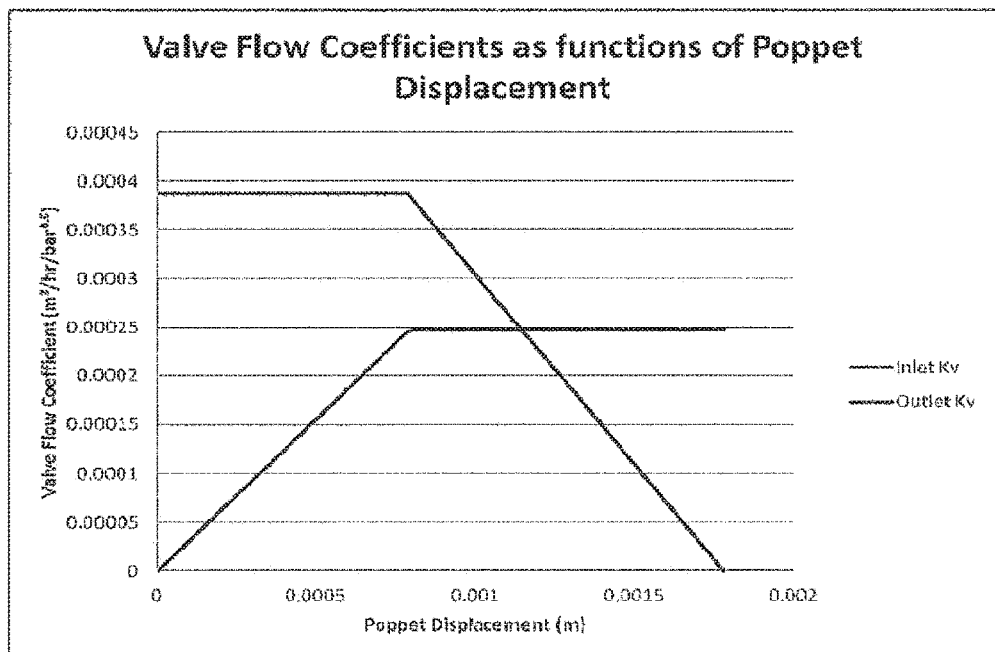

The valve outlet orifice (#2 in FIG. 17) was modeled similarly to the pressure throttling orifice as a function of poppet distance with a diameter of 0.00318 m (1/8"). A maximum circular area was also used to limit the flow coefficient. Modeling the valve orifices in this way resulted in flow coefficients as shown in FIG. 18.

The spray nozzle orifice (#3 in FIG. 17) was modeled with a flow coefficient calculated by the nominal size of the nozzle. In simulation, the nozzle size was varied from size 03 to size 10.

The damping force from fluid ($F_b$) was assumed to be the same as from previous testing. The damping coefficient (b) of 11.0 N-s/m related force to poppet velocity as:

$$F_b = b \cdot \dot{x}$$

Figure 19:
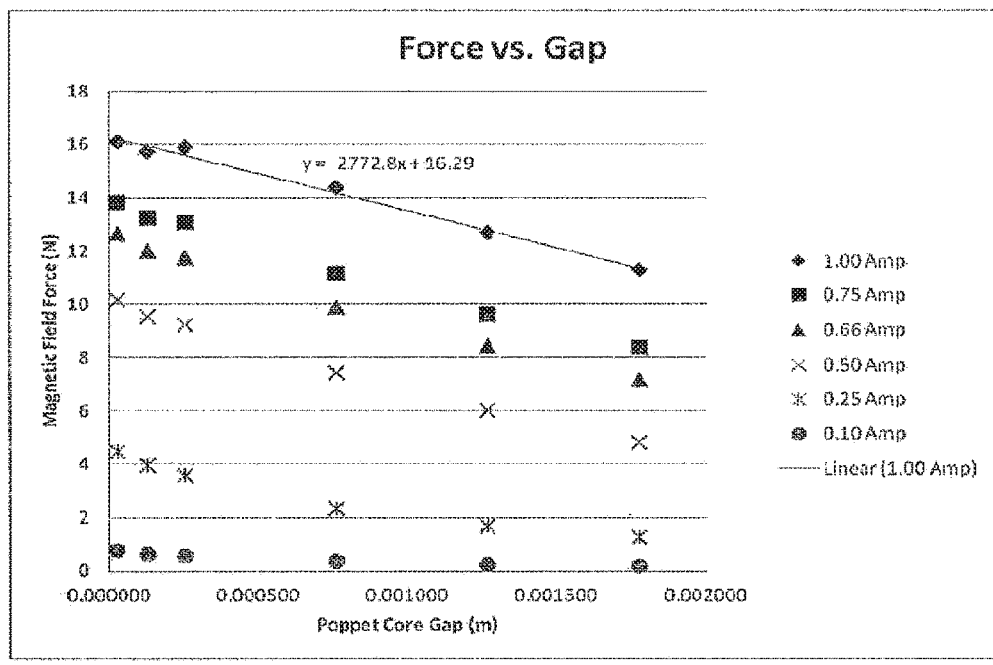
Figure 20:
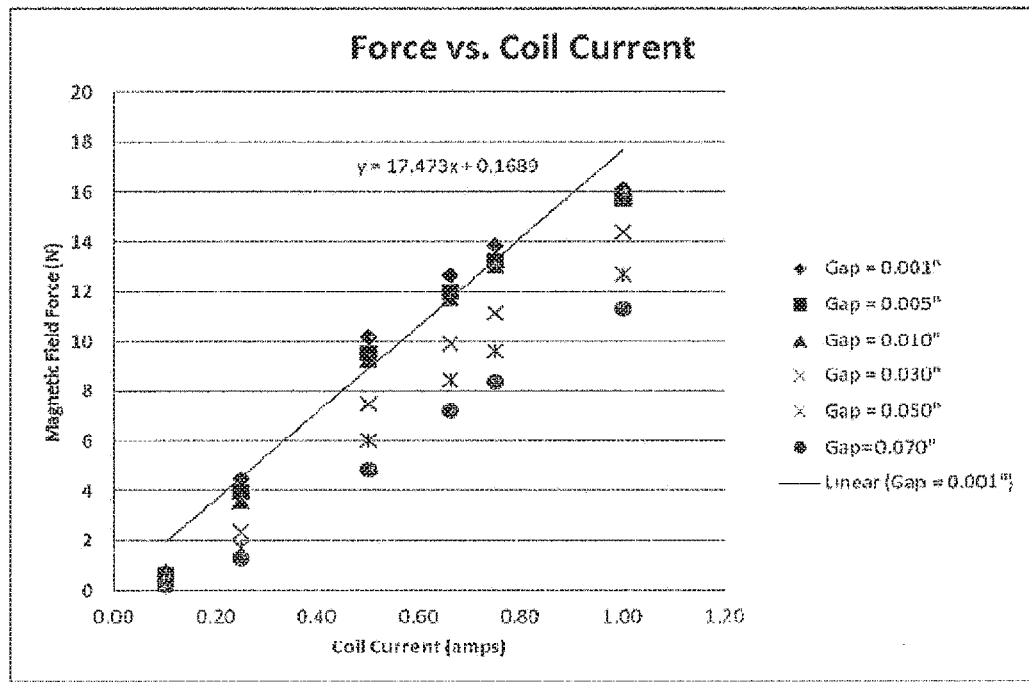
Figure 21:
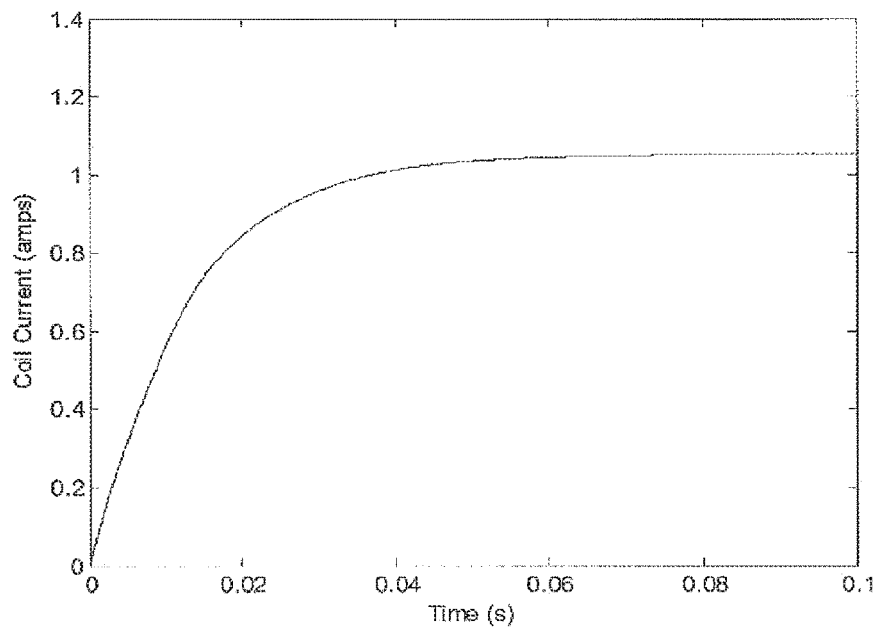
Figure 22:
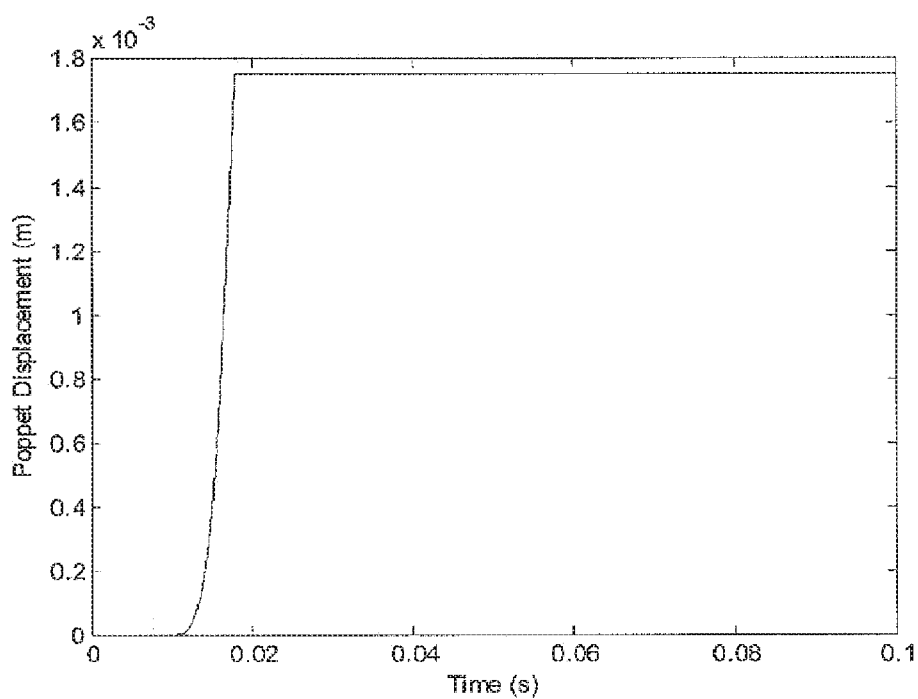
Figure 23:
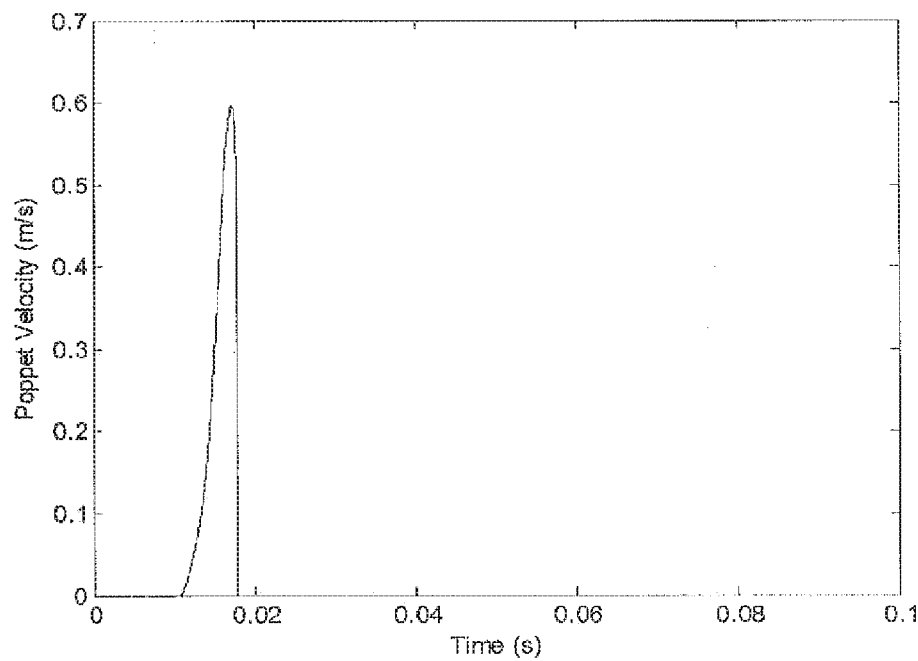
Figure 24:
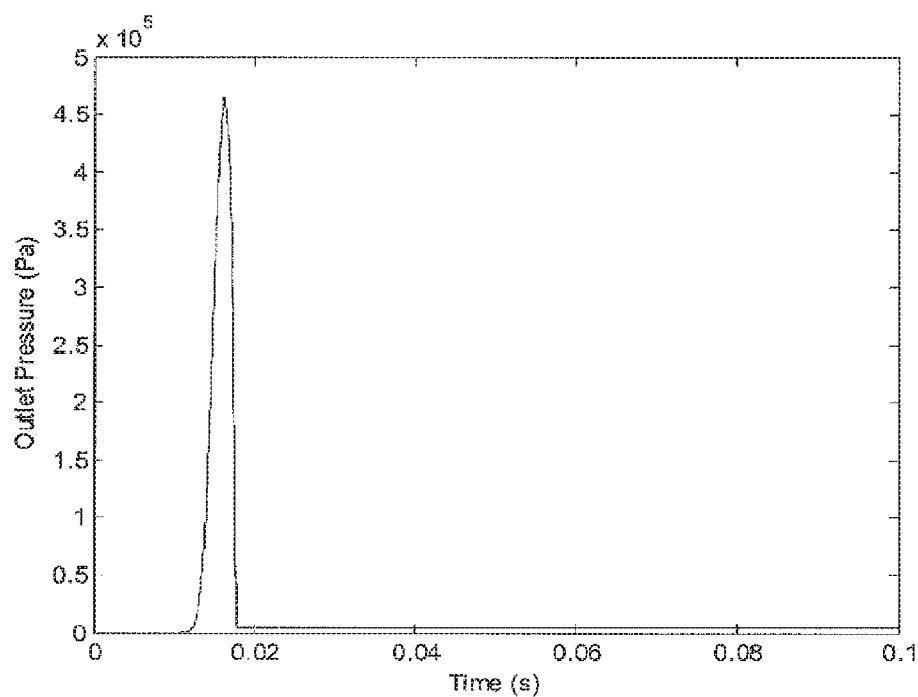

Force on the valve poppet from the magnetic field was dependent on the magnitude of the field acting on the gap area between the moving ferritic poppet and the stator core of the poppet barrel. For the modeled valve, force was determined to be a function of both coil current and poppet displacement. FIGS. 19 and 20 show the results of the analysis, wherein FIG. 19 shows magnetic field force as a function of the gap resulting from poppet displacement and FIG. 20 shows magnetic force as a function of solenoid current.

Based on the data in the graphs above, coil force was modeled as a linear function of coil current with one term related to poppet air gap:

$$F_B = i_L \cdot [C_{B1} \cdot x_{GAP} + C_{B2}]$$

where $C_{B1}$ and $C_{B2}$ were constant multipliers relating coil current and poppet air gap to magnetic field force. Based on the data above, $C_{B1} = -2773$ N/m-amp and $C_{B2} = 17.5$ N/amp.

The elemental equations of force displayed in FIG. 16 were related to poppet motion using Newton's 2nd law:

$$\Sigma F = m \cdot \ddot{x}$$

Rearranging and substituting force equations:

$$\ddot{x} = \frac{F_B}{m} - \frac{F_k}{m} - \frac{F_b}{m} - \frac{F_n}{m}$$

$$\ddot{x} = \frac{[C_{B1} \cdot x_{GAP} + C_{B2}]}{m} \cdot i_L + \frac{-k}{m} \cdot (x + x_0) + \frac{-b}{m} \cdot \dot{x} + \frac{-A_i \cdot \Delta p_i - A_o \cdot \Delta p_o}{m}$$

If state space variable $x_2$, representing poppet displacement, is referenced to the uncompressed spring length, the state space equation becomes:

$$\dot{x}_3 = \frac{[C_{B1} \cdot (x_{max} - x_2) + C_{B2}]}{m} \cdot x_1 + \frac{-k}{m} \cdot x_2 + \frac{-b}{m} \cdot x_3 + \frac{-A_i \cdot \Delta p_i - A_o \cdot \Delta p_o}{m}$$

$$\dot{x}_3 = a_{31} \cdot x_1 + a_{32} \cdot x_2 + a_{33} \cdot x_3 + b_{32} \cdot u_2$$

where:

$$a_{31} = \frac{[C_{B1} \cdot (x_{max} - x_2) + C_{B2}]}{m}$$

$$a_{32} = \frac{-k}{m}$$

$$a_{33} = \frac{-b}{m}$$

$$b_{31} = 0$$

$$b_{32} = \frac{-A_i + A_i + C_{KV1} - A_o \cdot C_{KV1} + A_o \cdot C_{KV1} \cdot C_{KV2}}{m}$$

and:

$$C_{KV1} = \frac{K_{V1}^2}{K_{V1}^2 + K_{V2}^2 - \frac{K_{V2}^4}{K_{V2}^2 + K_{V3}^2}}$$

$$C_{KV2} = \frac{K_{V2}^2}{K_{V2}^2 + K_{V3}^2}$$

Note that parameters $a_{31}$, $K_{V1}$, and $K_{V2}$ are not constants but functions of poppet displacement.

Using the model described above, the in-line valve was then analyzed to determine its dynamic response. As described above with reference to one embodiment of the valve 100 shown in FIG. 1, the in-line valve may be designed so that the valve is normally-closed when the solenoid coil is off. Thus, fluid pressure has a tendency to push the poppet against the outlet port to seal the valve. However, when the valve is 'pulsed', the movement may be designed to cycle between a poppet floating position (or throttling position) and a poppet position which seals the inlet port.

In order for the valve to transition from a 'closed' position (in which the poppet sits against the outlet port) to a 'PWM off' position (in which the poppet sits against the inlet port), a transition cycle (e.g., a 100-ms transition cycle) may be enacted. The transition cycle turns the solenoid coil on with 100% high-frequency duty cycle for 100 ms. The goal is to snap the valve poppet from the outlet orifice to the inlet orifice as quickly as possible.

The model was simulated with coil voltage=12.5 volts, fluid inlet pressure=90 psi, a nozzle nominal size of 10, and initial state variables of coil current=0 amps, poppet displacement=0 mm, and poppet velocity=0 mm/s. Responses of coil current, poppet displacement, poppet velocity, and valve outlet pressure for the transition cycle are displayed in FIGS. 21, 22, 23, and 24. As shown, the response of coil current was relatively slow.

Additionally, a step response was simulated in which the poppet moved from the valve inlet seat to a throttled position. This simulation was intended to observe the condition in which a low-frequency PWM pulse enabled flow through the valve.

Figure 25:
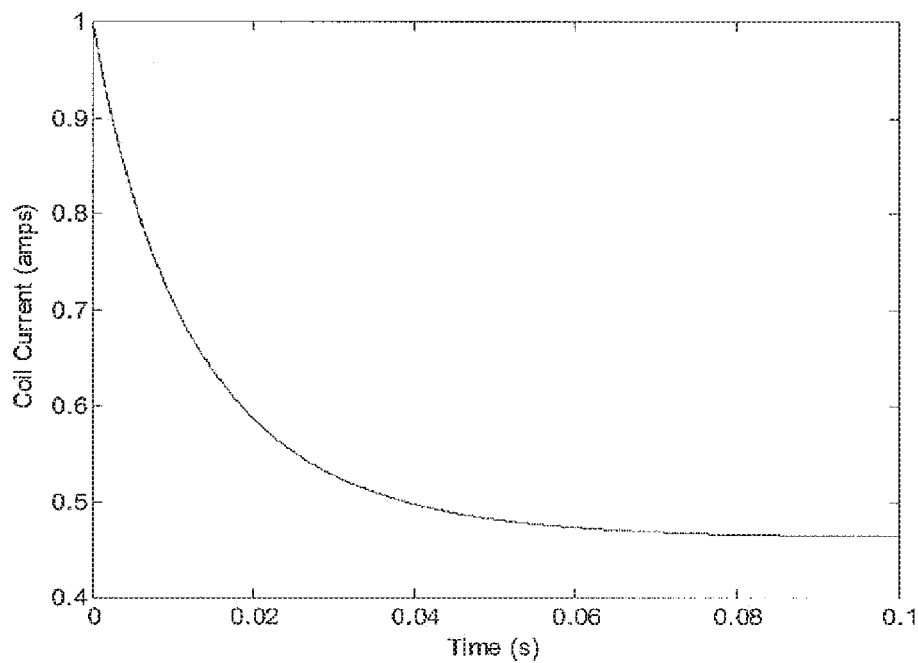
Figure 26:
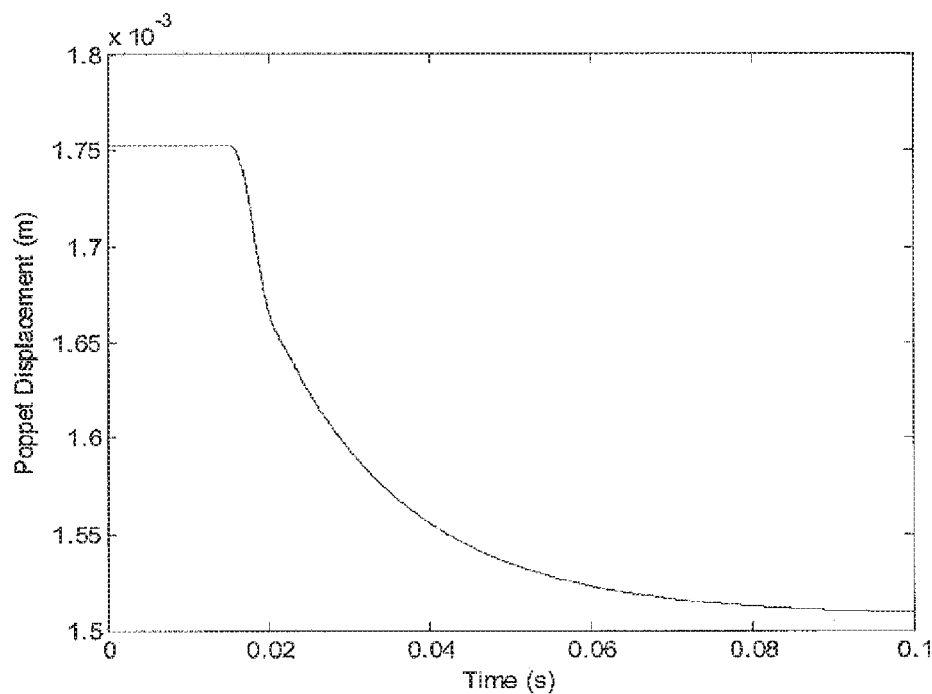
Figure 27:
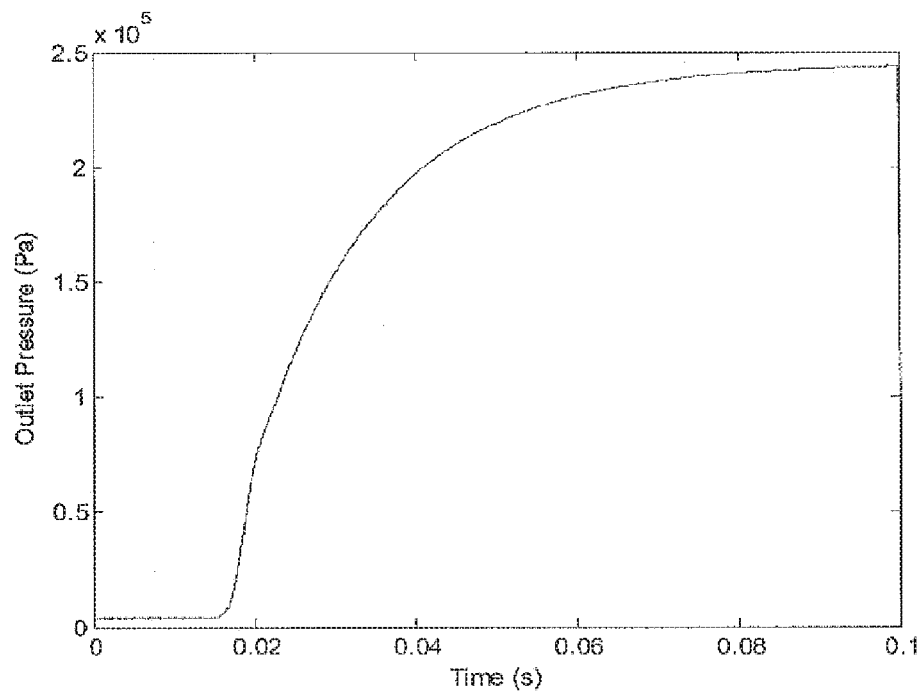

The model was simulated with coil voltage=5.5 volts, fluid inlet pressure=90 psi, a nozzle nominal size of 10, and initial state variables of coil current=1.0 amps (12.5-volt steady state), poppet displacement=1.78 mm (against inlet seat), and poppet velocity=0 mm/s. Responses of coil current, poppet displacement, and outlet pressure for the PWM step input are displayed in FIGS. 25, 26, and 27. As the responses show, the slow coil current transition resulted in slow poppet movement and slowly changing outlet pressure.

As described above, previous tests with counter-flow valve configurations had highlighted the use of a 'coil charging period' in which the high-frequency PWM duty cycle was set to 100% for a duration determined by a valve controlling algorithm. The coil charging period was designed to accelerate coil current change so that the valve would transition to a partially-open steady-state condition faster than with a simple step input.

In the case of an in-line valve, the high-frequency duty cycle is already set at 100% at the beginning of a pulse because the coil is actually holding the valve closed. In this case, the 'coil charging period' becomes a 'coil discharging period' in which the high-frequency PWM duty cycle is set to 0%.

Figure 28:
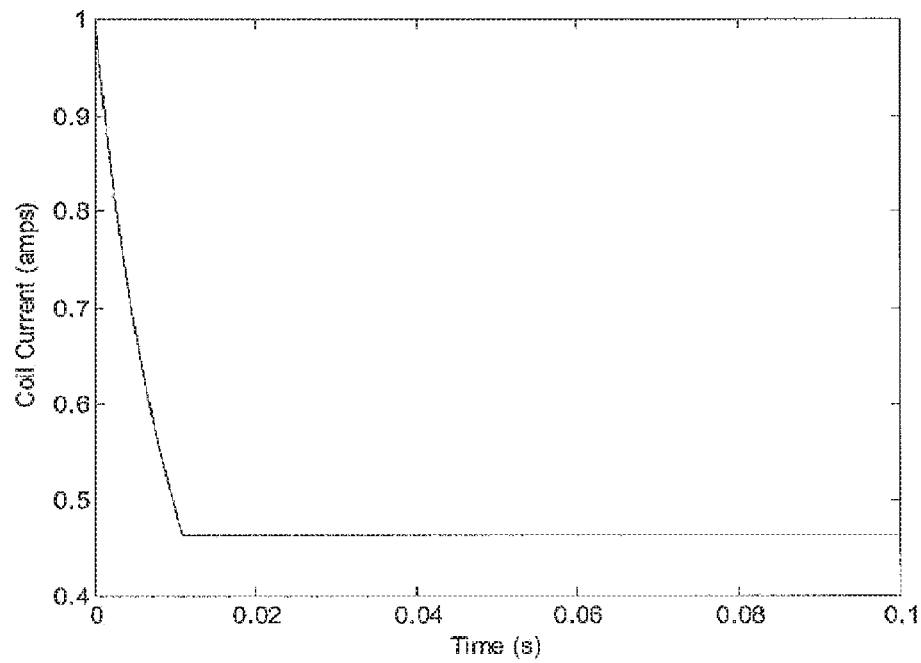
Figure 29:
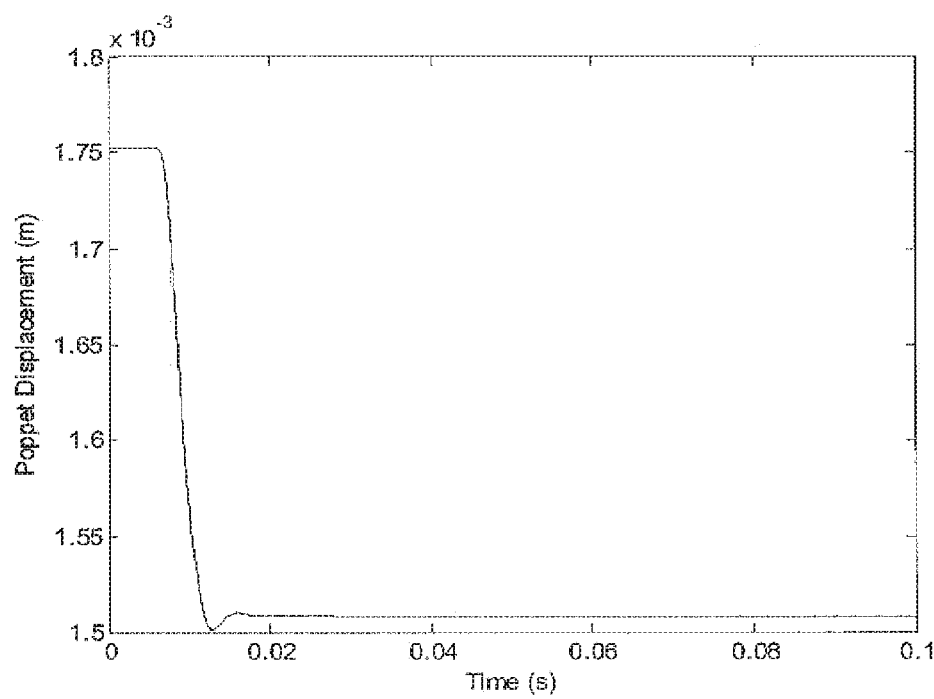
Figure 30:
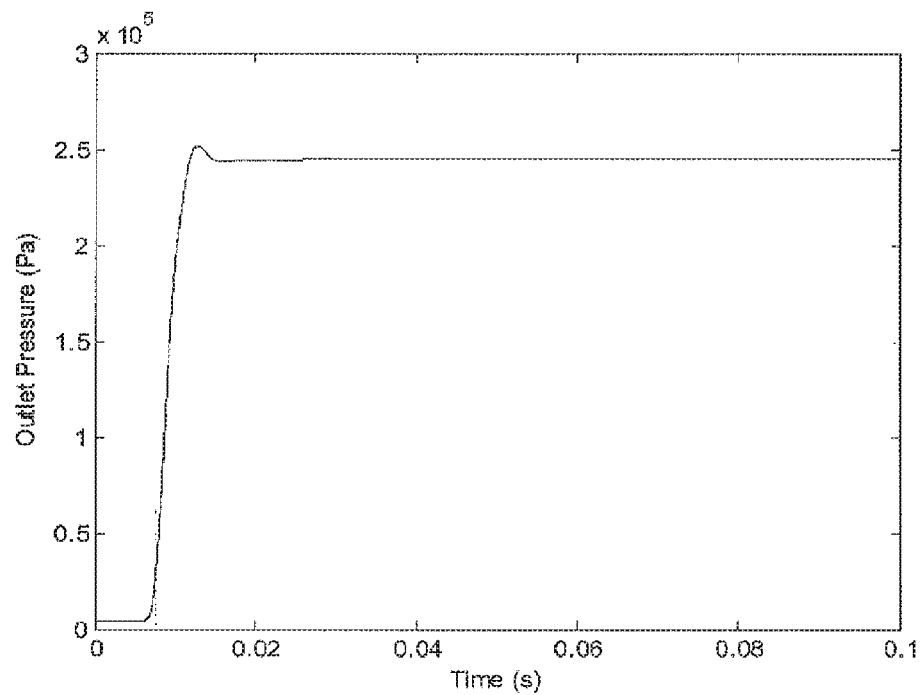

The previous PWM-on transition was simulated again, but included a coil discharging period in which the coil voltage was set to 0.0 volts until the current decreased to the desired steady-state value of 0.464 amps. The coil voltage then switched to a constant 5.5 volts. Fluid inlet pressure remained 90 psi. Initial state variables were the same as before: coil current=1.0 amp (12.5-volt steady state), poppet displacement=1.78 mm (against inlet seat), and poppet velocity=0 mm/s. Responses of coil current, poppet displacement, and outlet pressure for the PWM step input with the coil discharging period are displayed in FIGS. 28, 29, and 30. As the results show, the coil discharging period significantly decreased the turn-on time of the valve. With a simple step input of coil voltage, the valve began opening after 17 ms and reached steady state after 95 ms. With the coil discharging period, the valve began opening after 8 ms and outlet pressure reached steady state after 15 ms.

To further increase response of the valve, a FET was used to actively engage and disengage the feedback diode parallel to the coil. The act of setting the coil FET duty cycle to 0%, and simultaneously disengaging the feedback diode, cut off the coil current path. The result was a charge buildup on the FET side of the coil. Because the FET was protected by an ESD zener diode with a breakdown of 39 volts, and the supply voltage was 12 volts, the coil experienced a temporary voltage drop of −27 volts (12 volts-39 volts).

Figure 31:
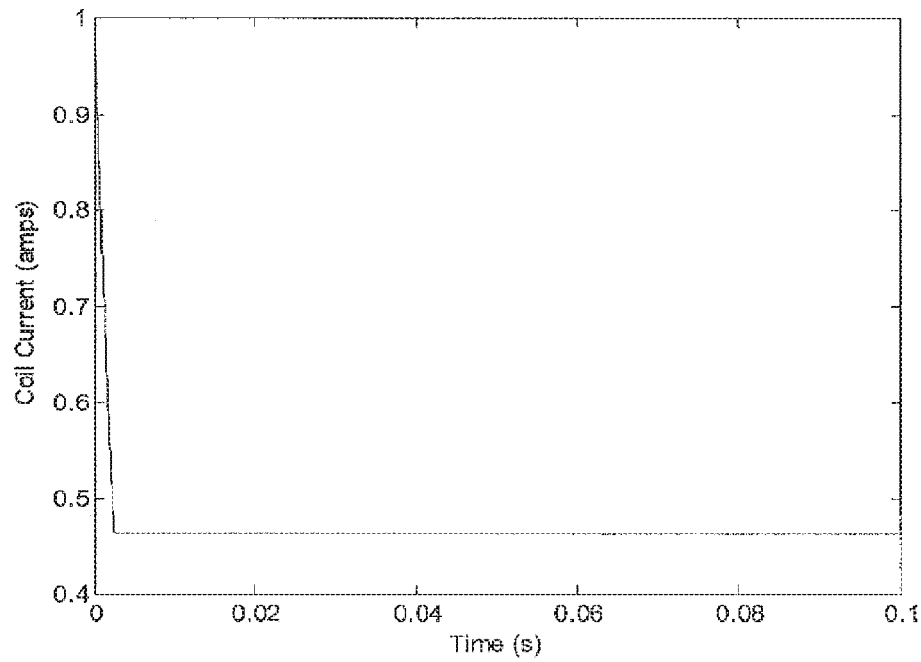
Figure 32:
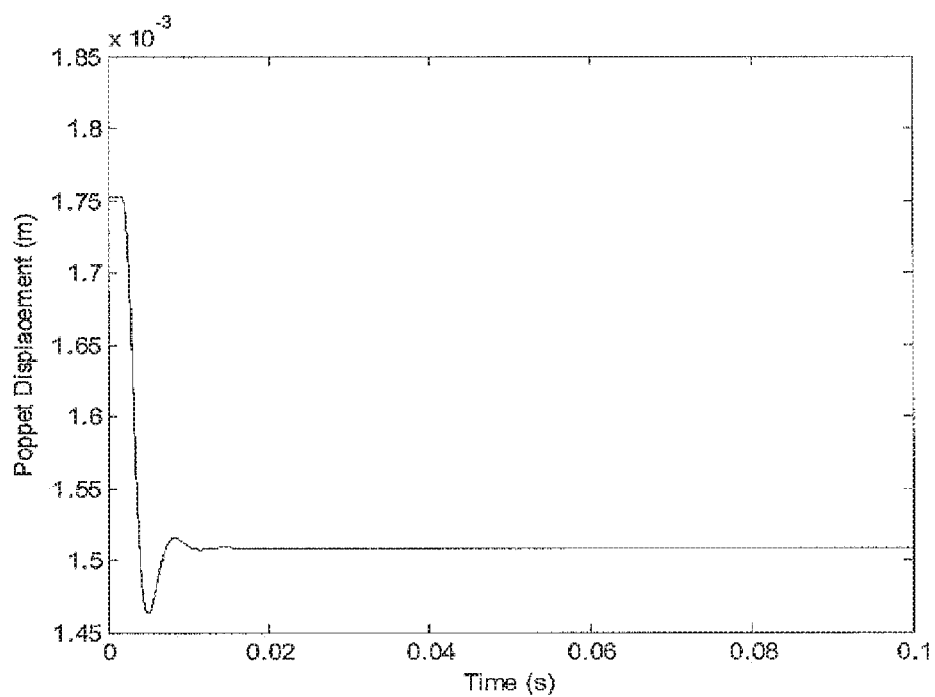

The PWM-on transition was simulated a third time. However, the coil discharging period utilized a coil voltage of −27.0 volts until the current decreased to the desired steady-state value of 0.464 amps. The coil voltage then switched to a constant 5.5 volts. Responses of coil current, poppet displacement, and outlet pressure are displayed in FIGS. 31, 32, and 33. As the results show, the coil current and valve outlet pressure transitioned very quickly to steady state values.

Figure 33:
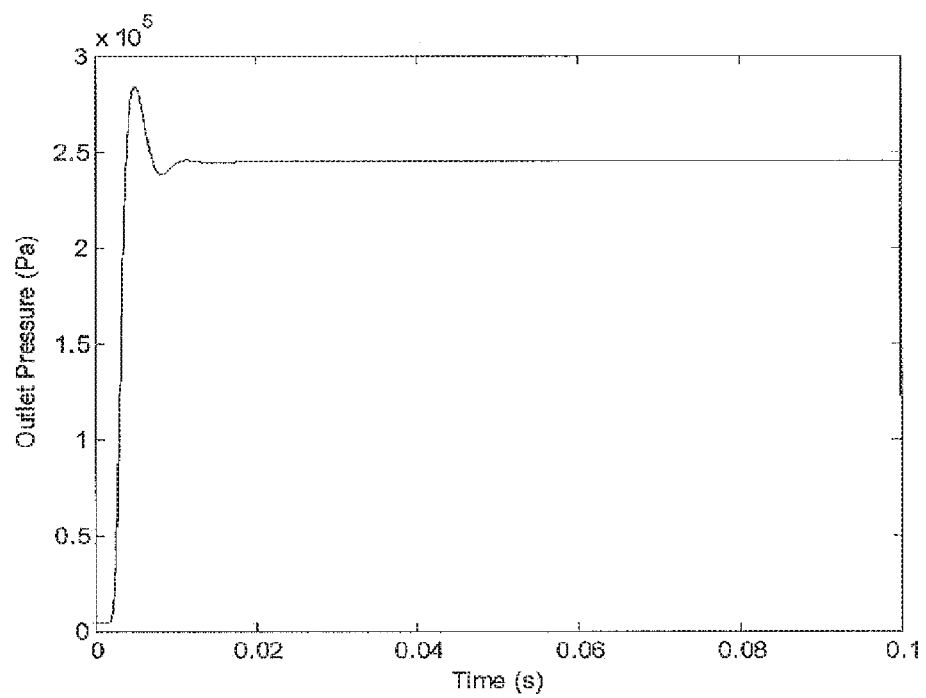

The overshoot in FIG. 33 indicated that very rapid coil current changes may result in an under-damped valve response. Slight modifications of valve geometry may allow for a critically-damped response, in which the outlet pressure reaches steady state more rapidly with minimal overshoot.

Development of a Solenoid Drive Circuit and Algorithm

The solenoid coil was driven with a custom microcontroller circuit containing a Control Area Network (CAN) transceiver, a source voltage sensing circuit, a current-sinking Field Effect Transistor (FET), a coil current sensing circuit, and 2 analog inputs connected to pressure transducers for microcontroller measurement of inlet and outlet pressure. The drive circuit was connected to a nozzle assembly (including a spray nozzle and a solenoid valve configured similar to the valve shown in FIG. 11) such that the FET was used to sink current from the coil, and its corresponding current-sensing circuit measured coil current during the ON cycle of the FET. A Schottky diode was connected parallel to the solenoid valve so that current flowing through the valve would feed back to the source in the instance that the FET turned off. The inductance of the coil and the high frequency switching of the FET resulted in nearly continuous current through the solenoid valve.

The pulse timing was regulated by the circuit's microcontroller. A "pulse" consisted of a 100 millisecond cycle in which a low frequency duty cycle value set the amount of on/off time. The "on" time consisted of a "coil charging period" in which the drive FET was turned on continuously and a "modulated period" in which the FET was turned on and off at a frequency of 10 kHz. The duration of the coil charging period was determined by the amount of time for the coil current to reach the desired steady state value. Coil current was continuously measured and compared to a threshold in order to trigger drive switching to a modulated signal.

Communication over the CAN bus allowed an operator to change parameters that controlled timing. Software pressure control utilized an iterative algorithm of trial poppet displacements to calculate the required coil current which would throttle outlet pressure to the desired value. The steps of this method included:

1. Input the size of spray nozzle (indicated spray nozzle flow coefficient flow/pressure^0.5)

Figure 34:
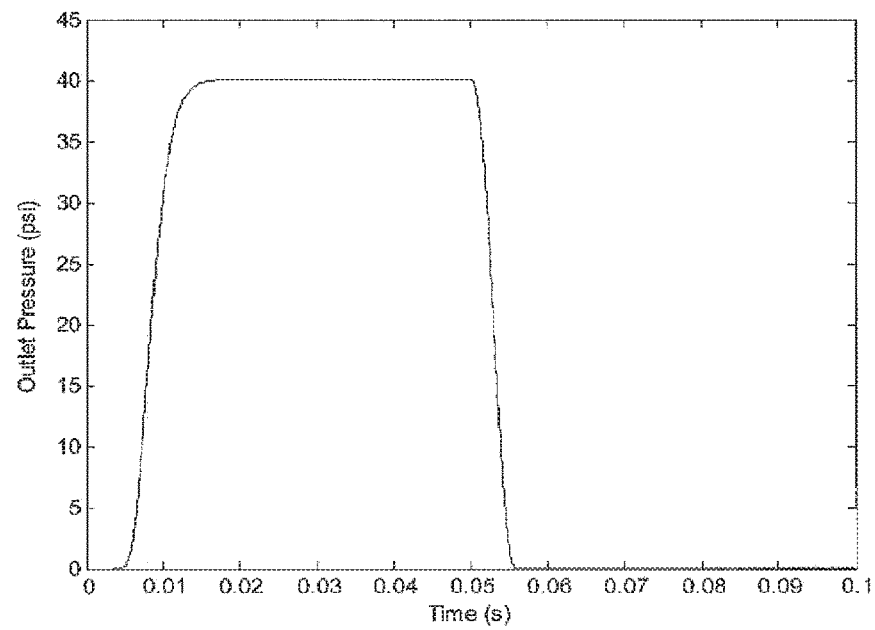

2. The system models multiple orifices in series and uses orifice equations to calculate orifice pressure drop ratios (pressure across valve/valve inlet pressure) for the varied trial poppet displacements based on size of the spray nozzle 3. At the beginning of a pulse, the high-frequency PWM is set to 100% (0% for coil discharging) and the current feedback switch is opened 4. The system measures the voltage supplied to the controller
5. The supply voltage is divided by the coil resistance to calculate the maximum coil current
6. The system measures inlet pressure
7. The inlet pressure is multiplied by the orifice pressure drop ratios to determine the resulting outlet pressures for the varied trial poppet displacements
8. The calculated outlet pressures are compared to the desired outlet pressure to determine the desired poppet displacement
9. Desired poppet displacement is used with measured inlet pressure to calculate the fluid force on the poppet
10. Desired poppet displacement is used to calculate the spring force
11. The coil force is calculated by equating the sum of all poppet forces to zero (equilibrium)
12. The coil force is used to calculate the desired coil current
13. The coil current is continually measured and compared to desired coil current
14. When the measured coil current equals the desired coil current, the high-frequency PWM is set to the percentage of the desired coil current divided by the maximum coil current and the current feedback switch is closed
15. The poppet moves to the desired position resulting from the equilibrium of forces The drive circuit and control algorithm above was simulated to determine valve outlet pressure response. In one simulation, inlet pressure was 90 psi, supply voltage was a constant 12.5 volts, desired pulse duty cycle was set to 50%, and desired outlet pressure was set to 40 psi. In FIG. 34, the resulting outlet pressure is shown.

Evaluation of Performance: Valve and Control Circuit

The performance of the disclosed valves was also assessed for two specific characteristics: the ability to control droplet size spectrum through proportional pressure control and the ability to control time-averaged volumetric flow rate at constant and varied pressures. Within these two primary verification objectives, several performance parameters affected the quality of the application. Among these were liquid pulse turn on time, liquid pulse turn off time, outlet pressure stability, and range of inlet pressure operation.

To assess these characteristics, a solenoid valve configured similar to the valve shown in FIG. 11 was connected to a pressurized water supply consisting of a stainless steel tank in which the head of air was regulated to a constant pressure. A clear nylon tube connected the supply tank to the valve apparatus with pressure transducers connected to the inlet and outlet of the valve. The valve apparatus also included a laser distance sensor in which the laser was aimed through a hole to measure valve poppet displacement. The valve was ported "under seat" so that the pressurized inlet attempted to push the poppet open. The valve's outlet port was connected to a spray nozzle cap. An adjustable supply voltage was used to power the valve drive circuit. Voltage measurements from the coil sink voltage, the coil current, the poppet displacement, and the valve outlet pressure were logged with an oscilloscope.

Nozzle spray droplet size was measured with a particle size analyzer. The valve and nozzle apparatus was connected to a conveyer which swept the apparatus horizontally 20 inches above the analyzer's detection laser. The nozzle spray fan and sweep direction were oriented perpendicular to the detection laser and the duration of the sweep was approximately 6 seconds. Average volumetric flow was measured by catching the spray out of the nozzle and recording the spray time and liquid volume.

Target pressure and pulse duty cycle values were identified for 3 nozzle sizes (fan nozzles 11002, 11004, and 11008), which are commercially available from TEEJET SPRAYING SYSTEMS. Target pressures for the nozzles were achieved using the control method in which the operator input a desired pressure. A steady state inlet pressure of 90 psi and a steady state supply voltage were used for all of the repetition trials. Additional tests were conducted on an 11004 DRIFT-GUARD nozzle, a D5-45 cone nozzle, and an 11004 nozzle with varied supply voltage and inlet pressure. The varied input trials were conducted to verify that the algorithm successfully compensated the coil drive signal for varied input conditions.

Figure 35:
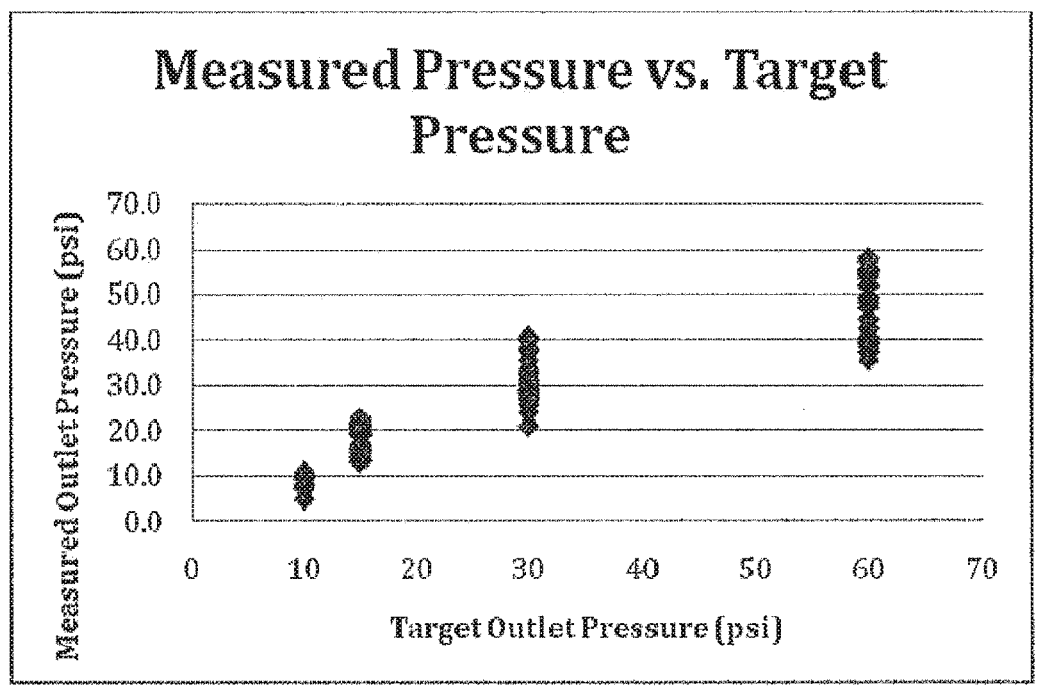

For every given combination of setpoints: nozzle, target pressure, pulse duty cycle, and repetition, waveforms were captured showing time relationships between the drive signal and the responding outlet pressure. Following the pulse trigger, pressure turn-on and turn-off times varied slightly but averaged about 8 ms each. Pressures reached steady state after 15 ms. FIG. 35 shows the relationship between target outlet pressure and measured outlet pressure for the trials performed.

Figure 36:
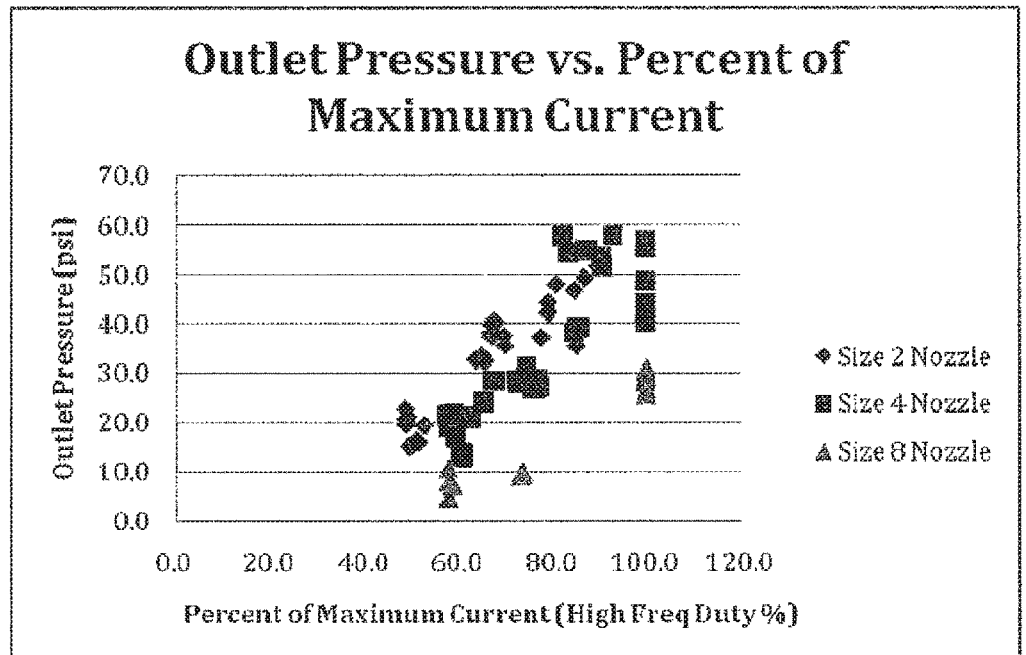

The mathematical models demonstrated a relationship between the high-frequency duty cycle (percent of maximum coil current) and the outlet pressure. Given a constant supply voltage, a constant inlet pressure, and a constant nozzle flow coefficient, outlet pressure should be a nearly linear function of high-frequency duty cycle. FIG. 36 displays the measured relationships between outlet pressure and percent of maximum current (high frequency duty) for the trials performed.

Figure 37:
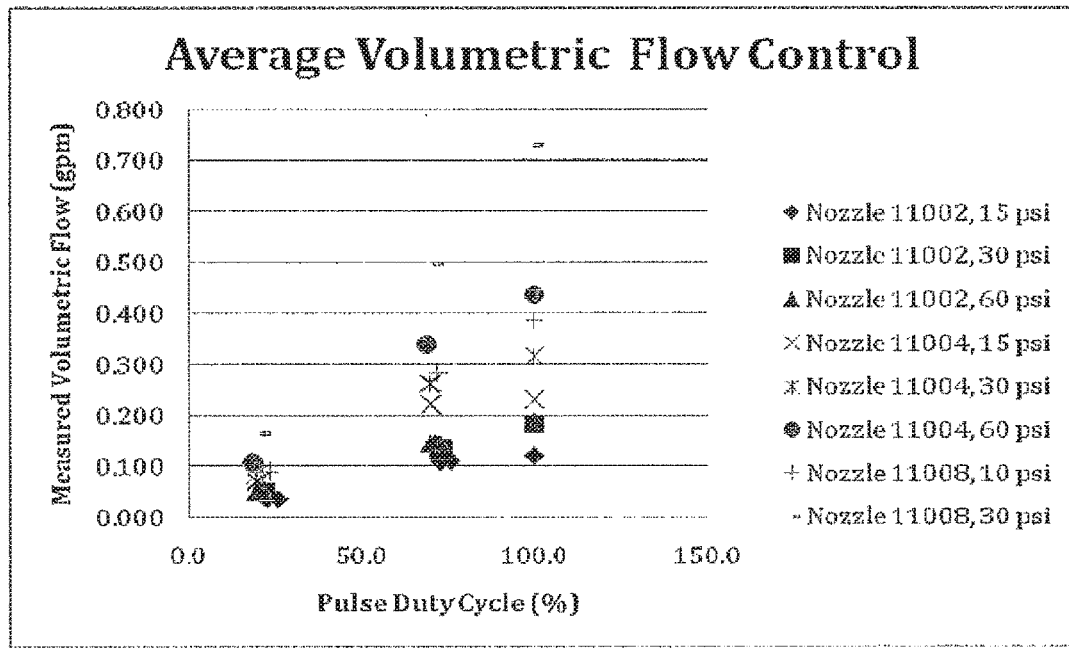

One primary performance characteristic of the valve was the ability to control time-averaged volumetric flow rate at constant and varied pressures. Valve outlet pressure (nozzle pressure), nozzle size, and valve pulse duty cycle all affect the volumetric flow rate through the valve and nozzle. The graph in FIG. 37 shows the relationships between average volumetric flow and fluid flow duty cycle given the other parameters.

Figure 38:
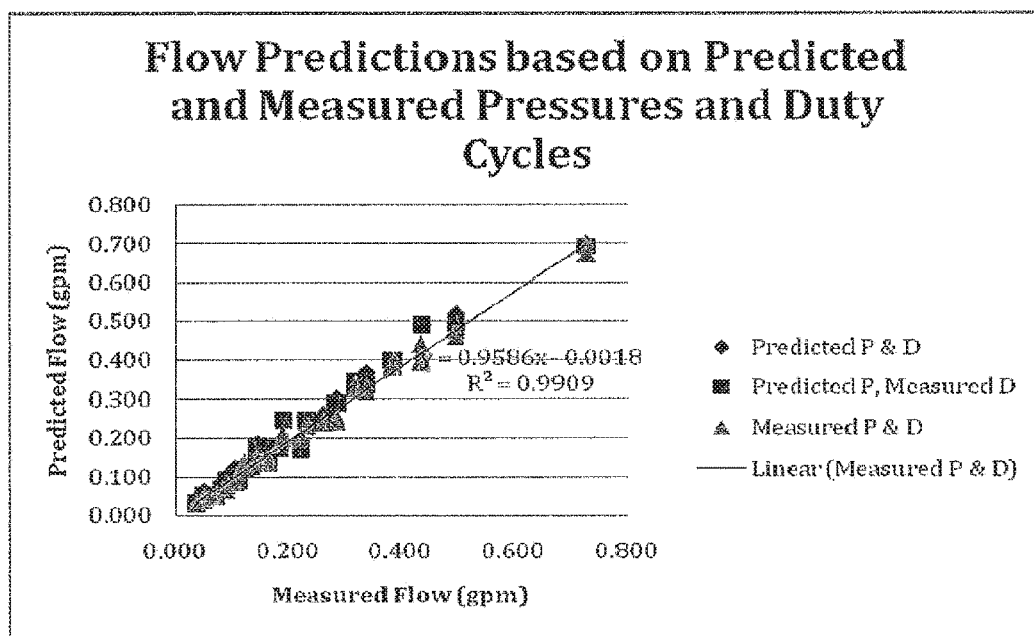

The linear relationships of each data set illustrated the ability to regulate volumetric flow rate through pulse duty cycle control. Further, target pressure and pulse duty cycle values were used to predict volumetric fluid flow based on orifice equations. FIG. 38 shows the relationships between the predicted fluid flow and the measured volumetric flow.

The other primary performance characteristic of the valve was the ability to control spray droplet size spectra during pulsed flow control. Test data for the commonly-used 11004 fan nozzle are shown in FIGS. 39A-39C. It must be noted that these data represent total control of the spray process. The inlet spray liquid pressure was maintained at 90 psi. Target nozzle pressures were achieved for 15, 30 and 60 psi and the flow control of 25%, 75% and 100% using the single valve actuator. The data show that the integrity of the droplet size spectrum is maintained during the control process and that the valve/drive electronics can achieve flow and droplet size control. In FIGS. 40A and 40B, example results for the small 11002 nozzle at low pulsing flow of 25% (FIG. 40A) and the large 11008 nozzle at higher pulsing flow of 75% (FIG. 40B), wherein the inlet spray liquid pressure was maintained at 90 psi. These data indicate that the single actuator can perform across the operating range of agricultural spray nozzle capacities and pressures.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for controlling the operation of a valve, the valve including a solenoid coil and a poppet movable relative to a valve inlet and a valve outlet, the solenoid coil configured to generate a magnetic field that acts on the poppet when current is supplied to the valve, the method comprising:

receiving an input associated with a desired outlet pressure for a fluid supplied through the valve;

receiving an input associated with an inlet pressure of the fluid supplied to the valve;

determining, with a controller, a desired poppet displacement for the valve based on the inlet pressure and the desired outlet pressure; and controlling the current supplied to the valve such that the poppet is displaced between a sealed position and a throttling position and maintained at the throttling position by the magnetic field acting on the poppet, wherein a distance between the sealed position and the throttling position corresponds to the desired poppet displacement.

2. The method of claim 1, wherein the valve is mounted to or integrated within a spray nozzle, the method further comprising receiving an input associated with a size or a flow coefficient of the spray nozzle.

3. The method of claim 1 further comprising determining orifice pressure drop ratios for a plurality of poppet displacements for the valve.

4. The method of claim 3 further comprising determining outlet pressures for the plurality of poppet displacements based on the orifice pressure drop ratios and the inlet pressure.

5. The method of claim 4, wherein determining, with a controller, a desired poppet displacement for the valve based on the inlet pressure and the desired outlet pressure comprises comparing the outlet pressures to the desired outlet pressure in order to determine the desired poppet displacement.

6. The method of claim 1 further comprising determining a poppet force acting on the poppet at the throttling position based on the desired poppet displacement.

7. The method of claim 6, wherein determining a poppet force acting on the poppet at the throttling position based on the desired poppet displacement comprises determining a coil force acting on the poppet at the throttling position based on the desired poppet displacement.

8. The method of claim 7 further comprising determining a desired coil current to maintain the poppet at the throttling position based on the coil force.

9. The method of claim 8, wherein controlling current supplied to the valve such that the poppet is displaced between a sealed position and a throttling position and maintained at the throttling position comprises supplying the desired coil current to the valve such that the poppet is moved to the throttling position.

10. The method of claim 1, wherein controlling a current supplied to the valve such that the poppet is displaced between a sealed position and a throttling position and maintained at the throttling position comprises supplying a dithering current to the valve.

11. The method of claim 10 further comprising analyzing the magnitude of a current ripple produced by the dithering current to determine the poppet displacement.

12. The method of claim 1, wherein controlling a current supplied to the valve such that the poppet is displaced between a sealed position and a throttling position and maintained at the throttling position comprises controlling the current supplied to the valve such that the poppet is cyclically pulsed between the sealed position and the throttling position according to a predetermined duty cycle.

13. The method of claim 1 further comprising pulsing the poppet along an axis of movement between the valve inlet and the valve outlet, wherein the valve inlet and the valve outlet are generally aligned along the axis of movement.

14. The method of claim 1, wherein the valve is mounted to or integrated within a spray nozzle, wherein receiving an input associated with a desired outlet pressure for a fluid supplied through a valve comprises receiving an input associated with a desired spray droplet size spectrum from the spray nozzle.

15. A method for controlling the flow of a fluid through a system, the system including a valve and a controller in communication with the valve, the valve including a solenoid coil and a poppet movable relative to a valve inlet and a valve outlet, the solenoid coil configured to generate a magnetic field that acts on the poppet when current is supplied to the valve, the method comprising:

sensing a pressure of fluid at at least one of the valve inlet and the valve outlet;

determining, with the controller, a desired poppet displacement based on the sensed pressure, wherein the desired poppet displacement corresponds to a throttling position of the poppet located intermediate a sealed position of the poppet and a second position of the poppet beyond the throttling position; and displacing the poppet from the sealed position to the throttling position based on the desired poppet displacement, wherein displacing the poppet includes controlling, using the controller, the current supplied to the solenoid coil such that the poppet is displaced by the magnetic field acting on the poppet.

16. The method of claim 15 further comprising maintaining the poppet at the throttling position.

17. The method of claim 15 further comprising controlling the supply of current to the solenoid coil such that the poppet is cyclically pulsed between the sealed position and the throttling position according to a predetermined duty cycle.

18. The method of claim 15, wherein the valve further includes a guide defining the valve inlet and the valve outlet, wherein the poppet is displaced within the guide, the poppet being sealed against a portion of the valve inlet when at the sealed position.

* * * * *